(12) United States Patent
Ono et al.

(10) Patent No.: US 9,988,510 B2
(45) Date of Patent: Jun. 5, 2018

(54) FLAME RETARDANT AND FLAME RETARDANT POLYURETHANE RESIN COMPOSITION

(71) Applicant: DAIHACHI CHEMICAL INDUSTRY CO., LTD., Osaka (JP)

(72) Inventors: Satoru Ono, Osaka (JP); Manabu Hirata, Osaka (JP)

(73) Assignee: Daihachi Chemical Industry Co., Ltd., Osaka (JP)

( * ) Notice: Subject to any disclaimer, the term of this patent is extended or adjusted under 35 U.S.C. 154(b) by 0 days. days.

(21) Appl. No.: 15/027,672

(22) PCT Filed: Oct. 7, 2014

(86) PCT No.: PCT/JP2014/005095
§ 371 (c)(1),
(2) Date: Apr. 6, 2016

(87) PCT Pub. No.: WO2015/064018
PCT Pub. Date: May 7, 2015

(65) Prior Publication Data
US 2016/0244582 A1    Aug. 25, 2016

(30) Foreign Application Priority Data
Oct. 31, 2013 (JP) ................................. 2013-227044

(51) Int. Cl.
| | |
|---|---|
| *C08J 9/00* | (2006.01) |
| *C09K 21/12* | (2006.01) |
| *C08K 5/5357* | (2006.01) |
| *C08G 18/48* | (2006.01) |
| *C08K 5/5399* | (2006.01) |
| *C08J 9/14* | (2006.01) |
| C08G 101/00 | (2006.01) |

(52) U.S. Cl.
CPC ........ *C08J 9/0038* (2013.01); *C08G 18/4829* (2013.01); *C08G 18/4845* (2013.01); *C08J 9/145* (2013.01); *C08K 5/5357* (2013.01); *C08K 5/5399* (2013.01); *C09K 21/12* (2013.01); *C08G 2101/00* (2013.01); *C08J 2375/04* (2013.01); *C08J 2375/08* (2013.01)

(58) Field of Classification Search
CPC ........... C08G 18/4829; C08G 18/4845; C08G 2101/00; C08J 9/0038; C08J 9/145; C08J 2375/04; C08J 2375/08; C08K 5/5357; C08K 5/5399; C09K 21/12; C08L 75/04
See application file for complete search history.

(56) References Cited

U.S. PATENT DOCUMENTS

| | | | |
|---|---|---|---|
| 3,817,881 A | 6/1974 | Turley | |
| 3,867,320 A | 2/1975 | Gambardella et al. | |
| 3,887,655 A * | 6/1975 | Shim ................ | C07F 9/657154 106/170.1 |
| 2015/0197624 A1 | 7/2015 | Ueki et al. | |

FOREIGN PATENT DOCUMENTS

| | | |
|---|---|---|
| CN | 101608348 A | 12/2009 |
| JP | 49-43272 A | 11/1974 |
| JP | 50-17463 A | 2/1975 |
| JP | 56-36512 A | 4/1981 |
| JP | 11-1612 A | 1/1999 |
| JP | 2005-162912 A | 6/2005 |
| WO | 2008/085926 A1 | 7/2008 |
| WO | 2014/002958 A1 | 1/2014 |

OTHER PUBLICATIONS

Second Chinese Examination Report, dated Oct. 23, 2017, for Chinese Application No. 201480058762.5 (with machine generated English Translation), 13 pages.

* cited by examiner

*Primary Examiner* — John Cooney
(74) *Attorney, Agent, or Firm* — Seed IP Law Group LLP

(57) ABSTRACT

The present invention provides a polyurethane which has excellent flame retardance and various excellent performances. A phosphoramidate compound having a specific structure is used as a flame retardant for a polyurethane foam or a polyurethane elastomer. By mixing this flame retardant with a raw material of a polyurethane resin (polyol, polyisocyanate and various additives), a polyurethane reactive raw material composition is obtained. By reacting the polyisocyanate and active hydrogen-containing compounds such as polyol in the polyurethane reactive raw material composition, a curing reaction takes place and a polyurethane foam composition or polyurethane elastomer composition is obtained. The obtained polyurethane resin composition has excellent flame retardance and other excellent performances as the polyurethane foam or polyurethane elastomer.

16 Claims, No Drawings

FLAME RETARDANT AND FLAME RETARDANT POLYURETHANE RESIN COMPOSITION

TECHNICAL FIELD

The present invention is related to polyurethane resin compositions that have excellent flame retardance and various excellent performances (for example, flame retardant polyurethane foam compositions and flame retardant elastomer compositions). The present invention is related to flame retardants, flame retardant polyurethane resin compositions, and raw material compositions and reactive raw material compositions therefor. In one embodiment, it is related to raw material compositions for a flame retardant polyurethane foam containing a phosphoramidate compound having a specific structure as a flame retardant, which compositions are comprehensively excellent in flame retardance, anti-fogging characteristics (low volatility), distortion characteristic, and scorch characteristic.

BACKGROUND ART

Polyurethane resins are mainly used in various fields of products for daily life, including automobile upholstery, furniture, materials for electrical devices, and the like, for their characteristics of being low cost, lightweight, and easy to shape. Regarding embodiments of uses, much polyurethane resins are often used as polyurethane foams. However, polyurethane foams, which are polymeric organic compounds, are flammable and may possibly cause an uncontrollable combustion once ignited. A fire caused in a living environment may lead to disaster affecting people's lives. From this point of view, the polyurethane foam production industry has made efforts to avoid fires by introducing flame retardation technology into the foams. Today, depending on the field of applications, parts of the products formed of polyurethane foams, including automobile upholstery, furniture, materials for electrical devices, and the like, are legally required to be flame retardant. Such legal regulations are provided by, for example, the UL Standards for electric products and the MVSS-302 for automobiles in the United States.

Accordingly, flame retardants to impart flame retardance to a polyurethane resin have been developed. However, for a polyurethane resin, in particular, a polyurethane foam, since the required performances are different from other resin products and special, normal flame retardants for general resins are not suitable for a polyurethane resin, in particular, a polyurethane foam.

As flame retardants for a polyurethane foam, halogen-containing flame retardants are widely used.

As examples of halogen-containing flame retardants for a polyurethane foam, tetrakis(2-chloroethyl)ethylene diphosphate (Patent Document 1), 2,2-bis(chloromethyl)-1,3-propylene-bis[bis(2-chloroethyl)phosphate] (Patent Document 2), tris[di(2-chloroethoxy)phosphinyl(dimethyl)methyl] phosphate, 2-chloroethyl bis[di(2-chloroethoxy)phosphinyl (dimethyl)methyl]phosphate (Patent Document 3), oxydi-2, 1-ethanediyl tetrakis(2-chloro-1-methylethyl)phosphate (Patent Document 4), and the like have been investigated to date. While halogen-based flame retardants have excellent performances, they contain a halogen element including chlorine, bromine, or the like. Thus, there is a problem that when a product of a polyurethane foam containing such a flame retardant is discarded and then incinerated, a hydrogen halide is generated. The hydrogen halide is an environmental load substance. Moreover, regarding some halogen-based flame retardants, there is a problem that halogenated dioxin or the like is generated. The halogenated dioxin or the like is a more harmful environmental load substance.

Accordingly, it is desired to develop an environment-friendly non-halogen-based flame retardant. However, the present state is that a comprehensively satisfactory flame retardant in points including flame retardance, anti-fogging characteristics, distortion characteristic, scorch characteristic, and the like is not present to date, and development of it is widely desired.

Further, for urethane elastomers, those elastomers having excellent flame retardance also have been desired.

CITATION LIST

Patent Document

[Patent Document 1] Japanese Publication for Opposition No. 49-43272
[Patent Document 2] U.S. Pat. No. 3,867,320
[Patent Document 3] Japanese Laid-Open Publication No. 56-36512
[Patent Document 4] Japanese Laid-Open Publication No. 11-1612

SUMMARY OF INVENTION

Problems to be Solved by the Invention

The main object of the present invention is to provide polyurethane foam compositions and polyurethane elastomer compositions that can solve the above-described problem, i.e., flame retardant polyurethane foam compositions and polyurethane elastomer compositions that do not contain halogen and are comprehensively good in flame retardance, anti-fogging characteristics, distortion characteristic, and scorch characteristic.

Means for Solving the Problem

The inventors intensively studied to solve the above-described problem, and consequently found that by using a non-halogen-containing phosphoramidate compound having a specific structure as a flame retardant for a polyurethane, flame retardant polyurethane resin compositions (for example, flame retardant polyurethane foam compositions and polyurethane elastomer compositions) that are comprehensively excellent in a variety of performances required for a polyurethane (for example, flame retardance, anti-fogging characteristics, distortion characteristic, and scorch characteristic) are obtained, and completed the present invention. In the present invention, preferably, a phosphoramidate compound having a certain structure is used as a flame retardant for a polyurethane foam or a polyurethane elastomer.

In the present invention, by mixing the flame retardant with raw material for a polyurethane resin (a polyol, a polyisocyanate, and various additives), a polyurethane reactive raw material composition is obtained. By reacting a polyisocyanate and an active-hydrogen-containing compound, such as polyol or the like, in the polyurethane reactive raw material composition, a curing reaction occurs and a polyurethane resin composition (for example, a polyurethane foam composition or a polyurethane elastomer composition) is obtained. The obtained polyurethane resin composition has excellent flame retardance and is also excellent in other performances required for a polyurethane (for example, performances required for a polyurethane foam or a polyurethane elastomer).

For example, the present invention provides flame retardants, flame retardant polyurethane foam compositions, and the like described below.

(Item 1) A flame retardant for a polyurethane foam or a polyurethane elastomer, consisting of a phosphoramidate compound represented by general formula (I):

[Chemical formula 1]

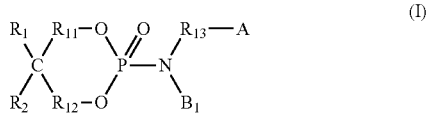

wherein $R_1$ and $R_2$ are each independently an alkyl group in which the number of carbon atoms is 1 to 3, $R_{11}$ and $R_{12}$ are each independently an alkylene group in which the number of carbon atoms is 1 to 3, $R_{13}$ is an alkylene group in which the number of carbon atoms is 1 to 6, $B_1$ is a hydrogen atom or an alkyl group in which the number of carbon atoms is 1 to 6, and A is a hydrogen atom or an organic group represented by general formula (II):

[Chemical formula 2]

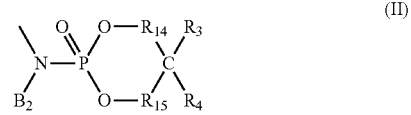

wherein $R_3$ and $R_4$ are each independently an alkyl group in which the number of carbon atoms is 1 to 3, $R_{14}$ and $R_{15}$ are each independently an alkylene group in which the number of carbon atoms is 1 to 3, and $B_2$ is a hydrogen atom or an alkyl group in which the number of carbon atoms is 1 to 6; and wherein when A is a hydrogen atom, then $B_1$ is an alkyl group in which the number of carbon atoms is 1 to 6, and $B_1$ and $R_{13}$-A are bound to form a nitrogen-containing heterocycle with the nitrogen atom in formula (I), and when A is an organic group represented by the general formula (II), $B_2$ is an alkyl group in which the number of carbon atoms is 1 to 6, and $B_1$ is an alkyl group in which the number of carbon atoms is 1 to 6, then $B_1$ and $B_2$ may be bound to form a nitrogen-containing heterocycle with the nitrogen atom in formula (I), the nitrogen atom in formula (II) and $R_{13}$.

(Item 2) The flame retardant according to item 1, wherein in the general formula (I), A is an organic group represented by the general formula (II).

(Item 3) The flame retardant according to item 1 or 2, wherein the flame retardant is for a polyurethane foam.

(Item 4) The flame retardant according to any one of items 1 to 3, wherein in the general formula (I), $R_1$ and $R_2$ are methyl groups and $R_{11}$ and $R_{12}$ are methylene groups.

(Item 5) The flame retardant according to any one of items 1 to 4, wherein in the general formula (I), A is an organic group represented by the general formula (II), $R_3$ and $R_4$ are methyl groups, and $R_{14}$ and $R_{15}$ are methylene groups.

(Item 6) The flame retardant according to item 5, wherein in the general formula (I), $R_{13}$ is an alkylene group in which the number of carbon atoms is 1 to 4.

(Item 7) The flame retardant according to item 6, wherein in the general formula (I), $R_{13}$ is an alkylene group in which the number of carbon atoms is 1 to 2.

(Item 8) The flame retardant according to any one of items 5 to 7, wherein in the general formula (I), $B_1$ and $B_2$ are hydrogen atoms.

(Item 9) The flame retardant according to any one of items 5 to 7, wherein in the general formula (I), $B_1$ and $B_2$ are bound to form a 5-membered to 8-membered nitrogen-containing heterocycle with the nitrogen atom in formula (I), the nitrogen atom in formula (II) and $R_{13}$.

(Item 10) The flame retardant according to item 9, wherein in the general formula (I), $B_1$ and $B_2$ are bound to form a 6-membered nitrogen-containing heterocycle with the nitrogen atom in formula (I), the nitrogen atom in formula (II) and $R_{13}$.

(Item 11) A flame retardant polyurethane foam reactive raw material composition comprising a flame retardant according to any one of items 1 to 10, a polyol, and a polyisocyanate, as well as a foaming agent.

(Item 12) A flame retardant polyurethane foam raw material composition comprising a flame retardant according to any one of items 1 to 10 and a polyol, wherein the raw material composition is to be mixed with a polyisocyanate immediately before a curing reaction is carried out.

(Item 13) A polyurethane foam comprising a flame retardant according to any one of items 1 to 10.

(Item 14) A production method of a polyurethane foam, wherein the method comprises a step of reacting a reactive raw material composition comprising a flame retardant according to any one of items 1 to 10, a polyol, a foaming agent, and a polyisocyanate.

(Item 15) A flame retardant polyurethane elastomer reactive raw material composition comprising a flame retardant according to any one of items 1, 2, and 4 to 10, a polyol for an elastomer, and a polyisocyanate, as well as a foaming agent.

(Item 16) A flame retardant polyurethane elastomer raw material composition comprising a flame retardant according to any one of items 1, 2, and 4 to 10 and a polyol for an elastomer, wherein the raw material composition is to be mixed with a polyisocyanate immediately before a curing reaction is carried out.

(Item 17) A polyurethane elastomer comprising a flame retardant according to any one of items 1, 2, and 4 to 10.

(Item 18) A production method of a polyurethane elastomer, wherein the method comprises a step of reacting a reactive raw material composition comprising a flame retardant according to any one of items 1, 2, and 4 to 10, a polyol for an elastomer, a foaming agent, and a polyisocyanate.

Effects of Invention

The present invention provides flame retardant polyurethane foam compositions and elastomer compositions having excellent flame retardance, anti-fogging characteristics, distortion characteristic, and scorch characteristic by using a phosphoramidate compound having a certain structure which contains no halogen, as a flame retardant.

The phosphoramidate compound according to the present invention has a high phosphorus content percentage; when used as raw material, it does not affect various physical properties of a product therefrom; and it does not contain a halogen atom, such as chlorine, bromine, and the like. Therefore, it can be found that there is no environmental pollution in combusting and discarding it, and it also has excellent recyclability.

Since the flame retardant compound of the present invention does not contain a halogen atom, they do not generate harmful halide gas and the like when combusted, and it is also effective in environmental protection. By using a flame retardant of the present invention, a resin composition to which excellent flame retardance is imparted is obtained.

EMBODIMENTS FOR CARRYING OUT THE INVENTION

A flame retardant used in the present invention consists of a phosphoramidate compound represented by general formula (I):

[Chemical formula 3]

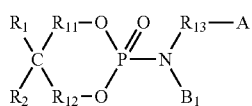

(I)

wherein $R_1$ and $R_2$ are each independently an alkyl group in which the number of carbon atoms is 1 to 3, $R_{11}$ and $R_{12}$ are each independently an alkylene group in which the number of carbon atoms is 1 to 3, $R_{13}$ is an alkylene group in which the number of carbon atoms is 1 to 6, $B_1$ is a hydrogen atom or an alkyl group in which the number of carbon atoms is 1 to 6, and A is a hydrogen atom or an organic group represented by general formula (II):

[Chemical formula 4]

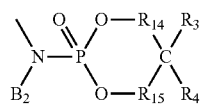

(II)

wherein $R_3$ and $R_4$ are each independently an alkyl group in which the number of carbon atoms is 1 to 3, $R_{14}$ and $R_{15}$ are each independently an alkylene group in which the number of carbon atoms is 1 to 3, $B_2$ is a hydrogen atom or an alkyl group in which the number of carbon atoms is 1 to 6; and wherein when A is a hydrogen atom, then $B_1$ is an alkyl group in which the number of carbon atoms is 1 to 6, and $B_1$ and $R_{13}$-A are bound to form a nitrogen-containing heterocycle with the nitrogen atom in formula (I), and when A is an organic group represented by the general formula (II), $B_2$ is an alkyl group in which the number of carbon atoms is 1 to 6, and $B_1$ is an alkyl group in which the number of carbon atoms is 1 to 6, then $B_1$ and $B_2$ may be bound to form a nitrogen-containing heterocycle with the nitrogen atom in formula (I), the nitrogen atom in formula (II) and $R_{13}$.

It should be noted that an "alkyl group" in the present specification refers to a monovalent group resulting from loss of one hydrogen atom from a chain or cyclic aliphatic hydrocarbon (alkane). In the cases of chain alkyl, the alkyl group is generally represented by $C_kH_{2k+1}$— (wherein k is a positive integer). A chain alkyl group may be a straight chain or a branched chain. A cyclic alkyl group may consist of a cyclic structure, or may have a structure in which a chain alkyl group is further linked to the cyclic structure. An "alkylene group" in the present specification refers to a divalent group resulting from loss of one more hydrogen atom from an alkyl group. For example, an "ethylene group" refers to a divalent group resulting from loss of one more hydrogen atom from an ethyl group.

Examples of alkyl groups in which the number of carbon atoms is 1 to 3 in the general formulas (I) and (II) include a methyl group, an ethyl group, a n-propyl group, and an isopropyl group. Of these, a methyl group and an ethyl group are preferable and a methyl group is particularly preferable in terms of flame retardance. Examples of alkylene groups in which the number of carbon atoms is 1 to 3 include a methylene group, an ethylene group, a n-propylene group, and an isopropylene group. Of these, a methylene group and an ethylene group are preferable and a methylene group is particularly preferable in terms of flame retardance.

Examples of alkyl groups in which the number of carbon atoms is 1 to 6 include a methyl group, an ethyl group, a n-propyl group, an isopropyl group, a n-butyl group, an isobutyl group, a tert-butyl group, a n-pentyl group, a n-hexyl group, and the like. Of these, a methyl group and an ethyl group are preferable and a methyl group is particularly preferable in terms of flame retardance. Examples of alkylene groups in which the number of carbon atoms is 1 to 6 include a methylene group, an ethylene group, a n-propylene group and an isopropylene group, a n-butylene group, an isobutylene group, a tert-butylene group, a n-pentylene group, a n-hexylene group, and the like. Of these, an alkylene group in which the number of carbon atoms is 4 or less is preferable and a methylene group and an ethylene group are particularly preferable in terms of flame retardance.

When A is a hydrogen atom, an aliphatic nitrogen-containing heterocycle formed by binding of $B_1$ and $R_{13}$ is a 3- to 13-membered, preferably 4- to 8-membered, more preferably 6-membered heterocycle containing one nitrogen.

A nitrogen-containing heterocycle that may be formed when A is an organic group represented by the general formula (II) is a 5-membered to 20-membered, preferably 5-membered to 8-membered, more preferably 6-membered or 7-membered, further preferably 6-membered heterocycle containing two nitrogens.

Examples of phosphoramidate compounds represented by the general formula (I) include:

a compound represented by general formula (III) where $B_1$ is an alkyl group in which the number of carbon atoms is 1 to 6, A is a hydrogen atom, $B_1$ and $R_{13}$-A are bound to form a nitrogen-containing heterocycle with the nitrogen atom in formula (I):

[Chemical formula 5]

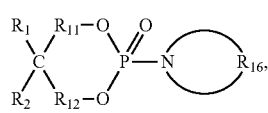

(III)

wherein $R_1$, $R_2$, $R_{11}$, and $R_{12}$ are the same as the definitions in the general formula (I), and $R_{16}$ is an alkylene group in which the number of carbon atoms is 2 to 12;

a compound represented by general formula (IV) where A is an organic group represented by the general formula (II), $B_1$ and $B_2$ are each independently a hydrogen atom or an alkyl group in which the number of carbon atoms is 1 to 6:

[Chemical formula 6]

(IV)

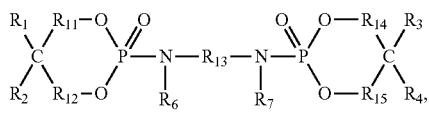

wherein $R_1$, $R_2$, $R_{11}$, $R_{12}$, and $R_{13}$ are the same as the definitions in the general formula (I), $R_3$, $R_4$, $R_{14}$, and $R_{15}$ are the same as the definitions in the general formula (II), and $R_6$ and $R_7$ are each independently a hydrogen atom or an alkyl group in which the number of carbon atoms is 1 to 6;

a compound represented by general formula (V) where $B_1$ is an alkyl group in which the number of carbon atoms is 1 to 6, A is an organic group represented by the general formula (II), $B_2$ is an alkyl group in which the number of carbon atoms is 1 to 6, $B_1$ and $B_2$ are bound to form a nitrogen-containing heterocycle with the nitrogen atom in formula (I), the nitrogen atom in formula (II) and $R_{13}$:

[Chemical formula 7]

(V)

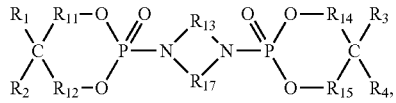

wherein $R_1$, $R_2$, $R_{11}$, $R_{12}$, and $R_{13}$ are the same as the definitions in relation to the general formula (I), $R_3$, $R_4$, $R_{14}$, and $R_{15}$ are the same as the definitions in relation to the general formula (II), and $R_{17}$ is an alkylene group in which the number of carbon atoms is 2 to 12; and the like.

Examples of compounds represented by the general formula (III) include compounds of the following formulas (1) to (3) and the like.

[Chemical formula 8A]

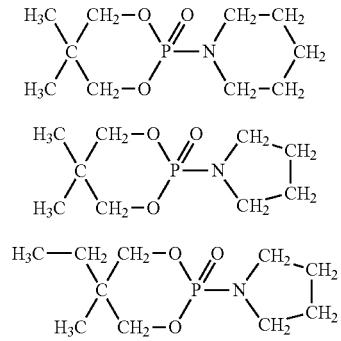

Examples of compounds represented by the general formula (IV) include compounds of the following formulas (4) to (9) and the like.

[Chemical formula 8B]

(4)

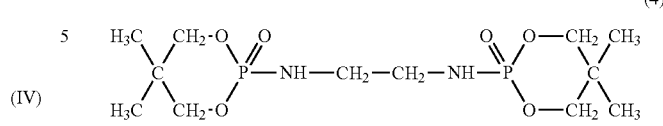

(5)

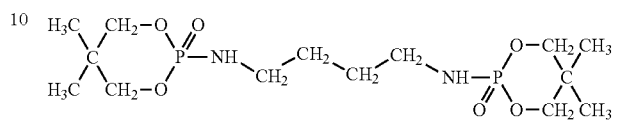

(6)

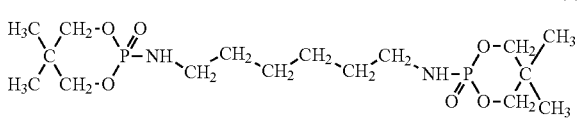

(7)

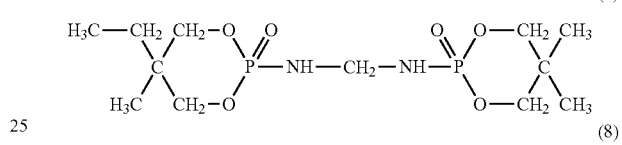

(8)

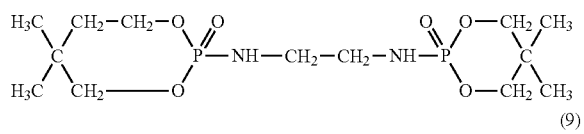

(9)

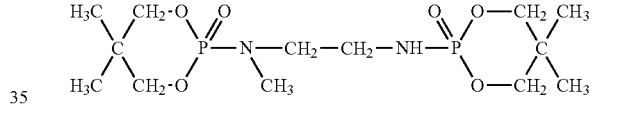

Examples of compounds represented by the general formula (V) include compounds of the following formulas (10) to (14) and the like.

{Chemical formula 8C]

(10)

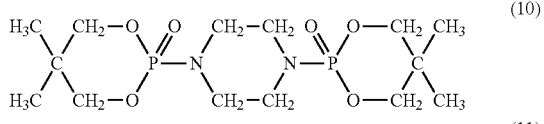

(11)

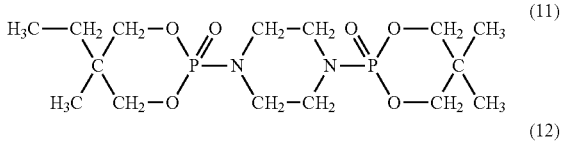

(12)

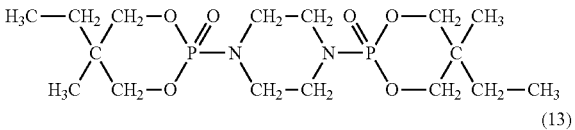

(13)

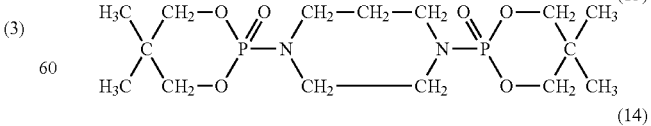

(14)

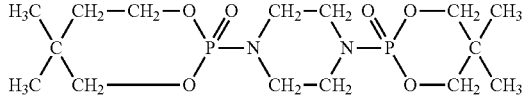

Among the phosphoramidate compounds represented by the general formula (I), a compound in which $R_1$ and $R_2$ are methyl groups and $R_{11}$ and $R_{12}$ are methylene groups is preferable from the viewpoint of flame retardance.

A in the general formula (I) is preferably an organic group represented by the general formula (II). From the viewpoint of flame retardance, it is preferable that $R_3$ and $R_4$ are methyl groups and $R_{14}$ and $R_{15}$ are methylene groups.

Regarding $R_{13}$ of the general formula (I), the number of carbon atoms is 1 to 6. From the viewpoint of flame retardance, the number of carbon atoms is preferably 1 to 5, more preferably 1 to 4, and further preferably 1 to 2.

When A of the general formula (I) is an organic group represented by the general formula (II), if $B_1$ of the general formula (I) and $B_2$ of the general formula (II) are not bound, $B_1$ and $B_2$ are preferably both hydrogen atom from the viewpoint of flame retardance. If $B_1$ and $B_2$ are bound, it is preferable that $B_1$ and $B_2$ are taken together to form an ethylene group or a propylene group. It is more preferable that $B_1$ and $B_2$ are taken together to form an ethylene group. In addition, it is preferable that they are bound to form a 5-membered to 8-membered nitrogen-containing heterocycle with the nitrogen atom in formula (I), the nitrogen atom in formula (II) and $R_{13}$, more preferably to form a 6-membered to 7-membered nitrogen-containing heterocycle, and further preferably to form a 6-membered nitrogen-containing heterocycle.

When A in the general formula (I) is an organic group represented by the general formula (II), it is preferable that $R_1$ and $R_2$ as well as $R_{11}$ and $R_{12}$ of the general formula (I) are the same as $R_3$ and $R_4$ as well as $R_{14}$ and $R_{15}$ of the general formula (II), respectively. That is, it is preferable that two phosphorus-containing ring structures are the same. If the two phosphorus-containing ring structures are the same, it has the advantage of being easy to synthesize such a compound.

Among the compounds of the above-described formulas (1) to (14), examples of preferable compounds include compounds of formulas (1), (4) to (7), (10), and (12). Compounds of formulas (1), (4) to (6), and (10) are more preferable and compounds of formulas (4) to (6) and (10) are further preferable.

(Synthesis Method)

A method of synthesizing a phosphoramidate compound represented by the general formula (I) is not particularly limited. Some of phosphoramidate compounds represented by the general formula (I) are known and synthesis methods thereof are also known. Therefore, they may be synthesized using the known synthesis methods without a change. In addition, the known synthesis methods may be appropriately modified. Therefore, a phosphoramidate compound represented by the general formula (I) can be synthesized by applying various known reactions for the synthesis of a phosphoramidate compound.

Specifically, the methods include a method of reacting a compound represented by the following general formula (VIa):

[Chemical formula 9A]

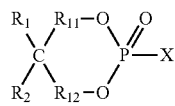

(VIa)

wherein $R_1$, $R_2$, $R_{11}$, and $R_{12}$ are the same as the definitions in the general formula (I) and X represents a halogen atom such as Br, Cl, and the like, with a corresponding amine compound and optionally, further with a compound represented by the following general formula (VIb):

[Chemical formula 9B]

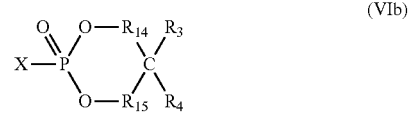

(VIb)

wherein $R_3$, $R_4$, $R_{14}$, and $R_{15}$ are the same as the definitions in the general formula (II) and X represents a halogen atom such as Br, Cl, and the like, to obtain a phosphoramidate compound represented by the general formula (I).

It should be noted that a compound of the formula (VIa) can be obtained, for example, by reacting a phosphorus oxyhalide (for example, phosphorus oxychloride or phosphorus oxybromide) with a diol represented by the following formula (VIIa):

[Chemical formula 9C]

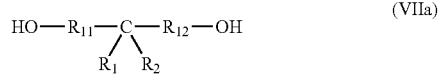

(VIIa)

(for example, 2,2-dimethyl-1,3-propanediol, 2-ethyl-2-methyl-1,3-propanediol, 2,2-dimethyl-1,4-butanediol, and the like) in a molar ratio of 1:1.

Also, a compound of the formula (VIb) can be obtained with a similar method. That is, it can be obtained by reacting a phosphorus oxyhalide (for example, phosphorus oxychloride or phosphorus oxybromide) with a diol represented by the following formula (VIIb):

[Chemical formula 9D]

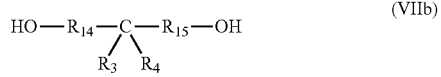

(VIIb)

(for example, 2,2-dimethyl-1,3-propanediol, 2-ethyl-2-methyl-1,3-propanediol, 2,2-dimethyl-1,4-butanediol, and the like) in a molar ratio of 1:1.

At the time of the synthesis of the compound of the formula (VIa) or a compound of the formula (VIb), if necessary, the reaction of a phosphorus oxyhalide with a diol can be carried out in an organic solvent. Solvent that does not have reaction activity with raw material, a phosphorus oxyhalide and a diol, can be used as the organic solvent. For example, toluene, xylene, chlorobenzene, dichlorobenzene, 1,4-dioxane, and the like can be used.

By way of specific example of a method of synthesizing a phosphoramidate compound represented by the general formula (I), when the phosphoramidate compound is a compound represented by the general formula (III), a compound of the general formula (VI a) corresponding to the phosphorus-containing ring structure and a cyclic amine corresponding to the nitrogen-containing ring structure of the general formula (III) (for example, piperidine) may be reacted in 1:1 (molar ratio).

For example, in the case of compounds of formulas (1) to (2), a compound of the formula (VIa) can be obtained by reacting a phosphorus oxyhalide (for example, phosphorus oxychloride or phosphorus oxybromide) with neopentyl glycol (2,2-dimethyl-1,3-propanediol) in a molar ratio of 1:1. By reacting this compound of formula (VIa) with a corresponding amine, a compound of formula (1) or (2) is obtained.

When the phosphoramidate compound is a compound represented by the general formula (IV) and two phosphorus-containing rings thereof have the same structure (i.e., when $R_1$, $R_2$, $R_{11}$, and $R_{12}$ are the same as $R_3$, $R_4$, $R_{14}$, and $R_{15}$), a compound of the general formula (VIa) corresponding to the structure of the phosphorus-containing ring may be reacted with a diamine corresponding to the structure of the moiety of —N($R_6$)—$R_{13}$—N($R_7$)— thereof (for example, ethylenediamine) in 2:1 (molar ratio).

When a phosphoramidate compound is a compound represented by the general formula (IV) and the two phosphorus-containing rings thereof have different structures, a compound of the general formula (VIa) and a compound of the general formula (VIb) corresponding to the two phosphorus-containing rings may be reacted with a diamine corresponding to the structure of the moiety of —N($R_6$)—$R_{13}$—N($R_7$)— thereof (for example, ethylenediamine) in 1:1:1 (molar ratio). With regard to the reaction, three types of compounds may be reacted in one step, or it is possible that a compound of the general formula (VIa) is reacted with a diamine and thereafter a reaction with a compound of the general formula (VIb) is performed.

When the phosphoramidate compound is a compound represented by the general formula (V) and the two phosphorus-containing rings thereof have the same structure (i.e., when $R_1$, $R_2$, $R_{11}$ and $R_{12}$ are the same as $R_3$, $R_4$, $R_{14}$ and $R_{15}$), a compound of the general formula (VIa) corresponding to the structure of the phosphorus-containing ring may be reacted with a cyclic diamine corresponding to the cyclic diamine structural moiety (for example, piperazine) in 2:1 (molar ratio).

When the phosphoramidate compound is a compound represented by the general formula (V) and the two phosphorus-containing rings thereof have different structures, a compound of the general formula (VIa) and a compound of the general formula (VIb) corresponding to the structure of the two phosphorus-containing rings may be reacted with a cyclic diamine corresponding to the cyclic diamine structural moiety (for example, piperazine) in 1:1:1 (molar ratio). With regard to the reaction, it is possible that the three types of compounds are reacted in one step, or a compound of the general formula (VIa) is reacted with a diamine and thereafter a reaction with a compound of the general formula (VIb) is performed.

(Flame Retardant)

With regard to various phosphoramidate compounds, those compounds synthesized with the aforementioned methods can be used as a flame retardant for a polyurethane without a change. If necessary, adjustment of particle diameter and the like may be carried out. In addition, if necessary, surface treatment and the like may be carried out.

The mean particle diameter of a phosphoramidate compound when used as a flame retardant is not particularly limited. However, 500 µm or less is desired, 300 µm or less is more desired, and 100 µm or less is further desired. In addition, from the viewpoints of equipment and cost to reduce a particle diameter, and the like, 10 nm or more is desired, 100 nm or more is more desired, and 1 µm or more is further desired.

With regard to a flame retardant of the present invention, one type of the above-described various phosphoramidate compounds may be used alone, or plural types thereof may be mixed and used.

When a flame retardant of the present invention, a phosphoramidate compound, is used for a polyurethane resin (for example, a polyurethane foam composition or a polyurethane elastomer composition), the amount of the phosphoramidate compound used is not particularly limited. However, it is preferable to use 0.1 parts by weight or more, more preferable to use 1 part by weight or more, and further preferable to use 5 parts by weight or more with respect to 100 parts by weight of a polyol. If necessary, 10 parts by weight or more also can be used. In addition, it is preferable to use 60 parts by weight or less, more preferable to use 40 parts by weight or less, and further preferable to use 30 parts by weight or less. If necessary, the amount can be 20 parts by weight or less. When the amount of the flame retardant used is too small, there may be some cases where sufficient flame retardance effect is not obtained. On the other hand, when the amount used is too large, there may be some cases where physical properties of a resin composition to be obtained is lower.

(Polyurethane Resin)

Hereinbelow, a polyurethane resin used in the polyurethane resin composition of the present invention is described in detail.

By mixing a flame retardant of the present invention with a polyurethane resin, a flame retardant polyurethane resin composition is obtained. A polyurethane resin may be a thermoplastic polyurethane resin or may be a thermosetting polyurethane resin.

In the case of a thermoplastic polyurethane resin, for example, a flame retardant polyurethane resin composition is obtained by mixing the resin and a flame retardant. Alternatively, it is possible that the reactive raw material for a urethane is mixed with a flame retardant, and thereafter, a synthesis reaction of the urethane is carried out.

In the case of a thermosetting polyurethane resin, for example, a flame retardant polyurethane resin composition may be obtained by mixing the resin with a flame retardant. However, preferably, after the reactive raw material for a urethane is mixed with a flame retardant, a urethane synthesis reaction is carried out to obtain a flame retardant polyurethane resin composition.

A polyurethane resin is, in one embodiment, in the form of polyurethane foam, and in another embodiment, in the form of polyurethane elastomer.

With regard to a flame retardant for a polyurethane, particularly for a polyurethane foam, the performances required for the flame retardant are significantly different from those required for a flame retardant for other resins, for example, polyester, polyolefin, or the like. Therefore, generally, it is not suitable to convert a flame retardant which is used for a polyester or the like to a polyurethane.

Generally, compounds having an aromatic structure are selected as a flame retardant which is used for polyester, various resins classified into engineering plastics, polyolefins or the like. This is because these resins are often molded at a high temperature and the thermal resistance and the mechanical strength are almost always required for a flame retardant added to these resins. For example, the molding processing temperature of polyester and the like is usually around 300° C. and sufficient resistance to the molding processing temperature is required for a flame retardant used for a polyester. Therefore, a compound having a thermal decomposition temperature of about 400° C. or therearound is selected as a flame retardant for a polyester.

On the other hand, in relation to a flame retardant for a polyurethane, particularly a flame retardant for a polyurethane foam, usually, anti-fogging characteristics, scorch characteristic, distortion characteristic, and the like are viewed as being more important than the thermal resistance and the mechanical strength. For example, a processing temperature for a polyurethane foam is up to about 200° C. at the highest. Therefore, generally, a compound having lower thermal resistance than a flame retardant for a polyester (for example, a compound having a thermal decomposition temperature of about 300° C. or therearound) and having excellent anti-fogging characteristics, scorch characteristic, distortion characteristic, and the like is used as a flame retardant for a polyurethane foam.

As described above, for a flame retardant for a polyurethane foam, the required performances and production/usage environments are different from other resins such as polyester and the like. Therefore, the design concept and the chemical structure of the flame retardant are different from flame retardants for other resins. Due to such a circumstance, it is common general knowledge for those skilled in the art of flame retardants for resins that a flame retardant for a polyurethane foam is largely different from flame retardants for other resins such as polyester and the like. In addition, due to this common general knowledge, it has been believed that if a flame retardant for a resin such as polyester and the like is converted to the use of polyurethane, particularly a polyurethane foam without a change, such a flame retardant compound cannot exhibit comprehensively desired performances.

As described above, according to the present invention, a flame retardant for a polyurethane for which significantly different performance from other resins is required, in particular, for polyurethane which is a special resin, is provided. In addition, this flame retardant attains an unexpectedly significant effect of having good performances in anti-fogging characteristics, scorch characteristic, and distortion characteristic required for a polyurethane foam, and having excellent flame retardance. As described above, according to the present invention, a flame retardant which is comprehensively very excellent as a flame retardant for a polyurethane foam is provided.

(Other Resins)

If necessary, a resin other than polyurethane may be mixed with a flame retardant polyurethane resin composition of the present invention. For example, a polyolefin-based resin (for example, polyethylene resin, polypropylene resin, or the like), polyester-based resins (for example, polyethylene terephthalate resin, polybutylene terephthalate resin, or the like), acryl-based resins (for example, polymethyl methacrylate resin or the like), and the like can be mixed with the polyurethane resin.

However, in order to effectively exhibit characteristics as a polyurethane resin, it is preferable to use a smaller amount of resins other than polyurethane. Accordingly, the amount of resins other than polyurethane is preferably 20 parts by weight or less, more preferably 10 parts by weight or less, more preferably 5 parts by weight or less, even more preferably 1 part by weight or less, particularly preferably about 0.5 parts by weight or less, and most preferably 0.1 parts by weight or less with respect to 100 parts by weight as the total amount of resins in the composition (i.e., the sum of the amount of the polyurethane resin and the amount of resins other than polyurethane).

In addition, a flame retardant polyurethane resin composition of the present invention can be made as a composition that does not comprise any resin other than polyurethane resins. By not using any resin other than polyurethane resins, characteristics of the polyurethane resin can be exhibited at a maximum.

(Polyol)

As a polyol used in a polyurethane resin composition of the present invention, various polyols known as polyols for a polyurethane resin can be used. In particular, various polyols usually used in producing a polyurethane foamed article can be suitably used. Specifically, polyether polyol, polyester polyol, polymer-dispersed polyol, and the like can be used. The polyol is not particularly limited as long as it is usually used as raw material for polyurethane formation. A polyol containing about 2 to 15 hydroxyl groups per molecule is preferred, and a polyol containing about 2 to 8 hydroxyl groups per molecule is more preferable. The hydroxyl value of a polyol is, in one embodiment, preferably about 25 to 70 mgKOH/g. The molecular weight of a polyol is, in one embodiment, about 100 to 20000, and in a preferable embodiment, about 250 to 6500. If the molecular weight is within this range, when used for a polyurethane foam, it is likely to satisfy the activity and viscosity suitable to form a urethane foam. Conversely, when the molecular weight is too large or too small, a good urethane foam is unlikely to be obtained.

Among the above-described polyol, preferable examples of polyether polyol include, for example, polyether polyol obtained by adding, like random copolymer or block copolymer polymerization, an alkylene oxide such as ethylene oxide, propylene oxide, or the like, to glycols such as ethylene glycol, propylene glycol, or the like; triols such as glycerin, trimethylolpropane, or the like; multi-functional polyols such as pentaerythritol, sorbitol, sucrose, or the like; amine compounds such as ammonia, triethanolamine, ethylenediamine, diethylenetriamine, aminoethylpiperazine, aniline, or the like. In one embodiment, a polyether polyol having a hydroxyl value of about 25 to 70 mgKOH/g is preferable.

A polyester polyol is a compound having hydroxyl groups at the ends that is obtained by polycondensation of a multi-functional carboxylic acid and a multi-functional hydroxy compound. It is possible to use a polyester polyol having preferably a number average molecular weight of about 500 to 10000, more preferably a number average molecular weight of about 1000 to 5000. Adipic acid, phthalic acid, succinic acid, azelaic acid, sebacic acid, and the like can be used as a multi-functional carboxylic acid. In addition, glycols such as ethylene glycol, propylene glycol, butane diol, diethylene glycol, and the like; polyhydric alcohols such as glycerin, trimethylolpropane, pentaerythritol, and the like; can be used as a multi-functional hydroxy compound.

A polymer-dispersed polyol can be obtained by mixing a polyether polyol and an ethylenically unsaturated monomer, optionally adding a chain transfer agent, a dispersion stabilizer, and the like, and radically polymerizing an ethylenically unsaturated monomer in the presence of a radical initiator. Examples of the ethylenically unsaturated monomer can include, for example, monomers containing a cyano group such as acrylonitrile, methacrylonitrile, and the like; (meth)acrylic acid esters such as methyl (meth)acrylate, butyl (meth)acrylate, stearyl (meth)acrylate, hydroxyalkyl (meth)acrylate (for example, hydroxyethyl (meth)acrylate), dimethylaminoethyl (meth)acrylate, dimethylaminopropyl (meth)acrylate, and the like; monomers containing a carboxyl group such as acrylic acid, methacrylic acid, itaconic acid, maleic acid, fumaric acid, and the like; monomers containing an acid anhydride such as maleic anhydride, itaconic acid anhydride, and the like; hydrocarbon compounds such as butadiene, isoprene, 1,4-pentadiene, and the like; aromatic hydrocarbon compounds such as styrene, α-methylstyrene, phenylstyrene, chlorostyrene, and the like; halogen-containing monomers such as vinyl chloride, vinylidene chloride, and the like; vinyl ethers such as vinyl ethyl ether, vinyl butyl ether, and the like; vinyl ketones such as vinyl ethyl ketone and the like; vinyl esters such as vinyl acetate and the like; acrylamide-type monomers such as acrylamide, N,N-dimethyl acrylamide, N-isopropyl amide, N,N-dimethylaminopropyl acrylamide, methylene bisacrylamide, and the like; methacrylamide-type monomers such as N,N-dimethylmethacryloylamide, and the like; and the like. With regard to these ethylenically unsaturated monomers, one type of a monomer may be used alone, or two or more types of monomers may be mixed and used.

With regard to the above-described polyol components, one type thereof may be used alone or two or more types thereof may be used in combination in accordance with characteristics required for polyurethane products such as desired polyurethane foamed article and the like.

(Polyisocyanate)

A polyisocyanate that is reacted with the above-described polyol is a compound having a plurality of isocyanate groups. In a polyurethane resin composition of the present invention, any conventionally known polyisocyanate which has been used for a polyurethane resin can be used as the polyisocyanate. As such a polyisocyanate compound, for example, an aromatic polyisocyanate, an aliphatic polyisocyanate, an alicyclic polyisocyanate, and the like can be used. Further, modified polyisocyanates, which are obtained by modifying these polyisocyanates, and the like can be used. In addition, if necessary, a mixture of two or more types of polyisocyanates may be used.

As a polyisocyanate, specifically, tolylene diisocyanate (TDI) (for example, 2,4-tolylene diisocyanate, 2,6-tolylene diisocyanate), 4,4-diphenylmethane diisocyanate (MDI), 1,5-naphthalene diisocyanate (NDI), triphenylmethane triisocyanate, xylylene diisocyanate (XDI), hexamethylene diisocyanate (HDI), dicyclohexylmethane diisocyanate, isophorone diisocyanate (IPDI), modified isocyanates obtained by modifying the aforementioned polyisocyanates (for example, carbodiimide-modified polyisocyanates, biuret modified polyisocyanates, dimers, trimers of the above, and the like), and the like can be used. Further, an isocyanate-group-terminated prepolymer and the like obtained from these polyisocyanates and an active hydrogen compound also can be used.

In addition, a type of compound in which an isocyanate group is protected by a protecting group, which is referred to as a so-called blocked polyisocyanate, may be used as the polyisocyanate. When a blocked polyisocyanate is used, a reaction is not initiated until it is heated even after it is mixed with a polyol. Therefore, there is an advantage that the mixture can be stably stored.

The amount of a polyisocyanate used is not particularly limited, and any amount can be used as long as it can react with a polyol to form a polyurethane. Accordingly, in view of the total molar number of isocyanate groups in a polyisocyanate and the total molar number of active hydrogen of hydroxyl groups in a polyol, water as a foaming agent, and the like, the blending amount can be appropriately determined such that the synthesis reaction of urethane proceeds well.

The amount of a polyisocyanate used can be appropriately designed in accordance with the intended performances of a urethane and the like. The isocyanate index, which is an indication of the amount, may be 100 or less, or more than 100. It is preferably 90 or more, more preferably 95 or more, further preferably 100 or more, even more preferably 105 or more. If necessary, the isocyanate index can be also 110 or more, 115 or more, or 120 or more. In addition, the isocyanate index is preferably 130 or less, more preferably 125 or less, further preferably 120 or less, and even more preferably 115 or less. If necessary, the isocyanate index can be also 110 or less, 105 or less, or 100 or less.

In this regard, the isocyanate index is a value which expresses the equivalent ratio of isocyanate groups of a polyisocyanate to the total amount of active hydrogen of a polyol, water, and the like in percentage. Specifically, when the stoichiometrically required amount of a polyisocyanate for the total amount of active hydrogen present in a reaction system is presumed as 100, it means the amount of the polyisocyanate that is actually present in the reaction system. Thus, an isocyanate index which is more than 100 means that the amount of the polyisocyanate is larger than that of an active hydrogen compound such as polyol and the like.

When the polyurethane resin is a flexible polyurethane foam, generally, an amount of a polyisocyanate is preferably such an amount that the isocyanate index is about 90 to 120, more preferably such an amount that the isocyanate index is about 95 to 115, and further preferably such an amount that the isocyanate index is about 100 to 115.

When the polyurethane resin is a rigid polyurethane foam, generally an amount of a polyisocyanate is preferably such an amount that the isocyanate index is about 100 to 110.

In yet another embodiment, when the polyurethane resin is a polyisocyanurate foam (PIR), the amount of a polyisocyanate is preferably such an amount that the isocyanate index is about 180 to 300, and more preferably such an amount that the isocyanate index is about 220 to 260. When the amount of a polyisocyanate is too large or too small, it is prone to be difficult to obtain a polyurethane foam having good physical properties.

(Foaming Agent)

When a polyurethane resin of the present invention is a polyurethane foam, if necessary, a foaming agent is added to a raw material composition and a reactive raw material composition thereof. A foaming agent is for the purpose of making a polyurethane foamed article by performing foaming during a polyurethane polymerization reaction or by foaming a polyurethane resin. When a polyurethane foam is industrially manufactured, a foaming agent is generally used. When no foaming agent is used, since it is prone to be difficult to make it foamed sufficiently, it is very preferable to use a foaming agent.

In a polyurethane resin raw material composition, known foaming agents, which are used for normal polyurethane foams, can be used as a foaming agent. Specifically, for example, water, pentane, cyclopentane, hexane, cyclohexane, dichloromethane, carbon acid gas, and the like are used. With regard to these foaming agents, one type thereof may be used alone or two or more types thereof may be mixed and used in accordance with a known method of use and depending on the required density, other physical properties, and the like of a foamed article. In one embodiment, it is industrially preferable to use water. Therefore, it is preferable to use water alone or a mixture of water and a foaming agent other than water depending on the required density, other physical properties, and the like of a foamed article.

While the amount of a foaming agent used is not particularly limited, it is usually preferably 0.01 parts by weight or more, and more preferably 0.1 parts by weight or more with respect to 100 parts by weight of a polyol. In addition, it is preferably 50 parts by weight or less, and more preferably 40 parts by weight or less.

When water is used as a foaming agent, it is preferably in an amount of 0.1 parts by weight or more, and more preferably in an amount of 1 part by weight or more with respect to 100 parts by weight of a polyol. In addition, it is preferably 10 parts by weight or less, and more preferably 6 parts by weight or less. Further, if necessary, a foaming agent other than water may be used in combination depending on the required density, other physical properties, and the like of a foamed article. When a foaming agent other than water is used in combination, the amount of the foaming agent other than water is preferably 0.1 parts by weight or more, and more preferably 1 part by weight or more with respect to 100 parts by weight of a polyol. In addition, it is preferably 50 parts by weight or less, and more preferably 30 parts by weight or less.

When the amount of a foaming agent used is too small, it is prone to be difficult to foam it enough. In addition, when the amount of a foaming agent used is too large, the physical properties of the foamed article may be lowered.

(Catalyst)

If necessary, a catalyst is added to a polyurethane resin composition of the present invention. The catalyst is for accelerating a urethane-forming reaction of a polyol and a polyisocyanate. A catalyst used for a polyurethane resin composition of the present invention is not particularly limited, various catalysts conventionally known to accelerate a reaction of synthesizing a polyurethane can be used. They, when classified roughly, include amine catalysts and metal catalysts.

With regard to the catalyst, one type of a catalyst may be used alone, or plural types of catalysts may be used in combination.

In a preferable embodiment, specifically as the amine catalysts, tertiary amines such as triethylenediamine, dimethylethanolamine, bis(2-dimethylaminoethyl)ether, N,N', N'-trimethylaminoethylpiperazine, N-ethylmorpholine, and the like are used. In addition, as the metal catalysts, organic metal compounds containing various metals such as tin, copper, zinc, cobalt, nickel, and the like are typical catalysts, and especially a catalyst containing tin can be preferably used. Specific examples of tin catalysts include, for example, tin octylate (tin octoate), dibutyltin dilaurate, and the like. Further, for example, acetate salts, alkali metal alcoholate, and the like can be used as specific examples other than tin catalysts. A metal catalyst is suitably used particularly in making a slab-type flexible polyurethane foam.

While the amount of an amine catalyst to be used is not particularly limited, it is usually preferably 0.02 parts by weight or more, and more preferably 0.05 parts by weight or more with respect to 100 parts by weight of a polyol. If necessary, the amount of an amine catalyst used can be 0.1 parts by weight or more. In addition, the amount of an amine catalyst used is preferably 3 parts by weight or less, and more preferably 1 part by weight or less. If necessary, the amount of an amine catalyst used can be also 0.5 parts by weight or less.

While the amount of a metal catalyst to be used is not particularly limited, usually, the amount of a metal catalyst is preferably 0.02 parts by weight or more, and more preferably 0.05 parts by weight or more with respect to 100 parts by weight of a polyol. If necessary, the amount of a metal catalyst can be also 0.1 parts by weight or more. In addition, in one embodiment, the amount of a metal catalyst is 1 part by weight or less, preferably 0.8 parts by weight or less, and more preferably 0.5 parts by weight or less. If necessary, the amount of a metal catalyst can be also 0.3 parts by weight or less.

It should be noted that a metal catalyst is not an essential component in the urethane resin composition of the present invention. Accordingly, if a sufficient urethane synthesizing reaction is performed without addition of a metal catalyst, it is not necessary to add a metal catalyst. For example, when a rigid polyurethane foam is made, in general, a metal catalyst is not used.

(Foam Stabilizer)

When a polyurethane resin is a polyurethane foam, raw material for the polyurethane foamed article preferably contains a foam stabilizer in order to carry out foaming smoothly. By using a silicone foam stabilizer, mixing and emulsifying raw material components and dispersing entrained gas is made easier. In addition, effects of preventing aggregation of form and stabilizing cell films, and the like can be attained. Thus, a foam having higher characteristics can be provided.

As the foam stabilizer, those which are generally used in producing a polyurethane foamed article can be used. In a preferable embodiment, specifically as a foam stabilizer, anionic surfactants such as silicone compounds, sodium dodecylbenzenesulfonate, sodium lauryl sulfonate, and the like, polyether siloxane, phenol-based compounds, and the like can be used.

The content of the foam stabilizer is preferably 0.1 parts by weight or more, and more preferably 0.5 parts by weight or more with respect to 100 parts by mass of a polyol. If necessary, the content of the foam stabilizer can be 1 part by weight or more. In addition, the content of the foam stabilizer is preferably 5 parts by weight or less, and more preferably 2.5 parts by weight or less. If necessary, the content of the foam stabilizer can be also 2 parts by weight or less or 1.5 parts by weight or less. When the content of the foam stabilizer is too small, a foam stabilizing action is not sufficiently attained at the time of foaming of raw material for a polyurethane foamed article and it may be difficult to obtain a good foamed article. On the other hand, when the content of the foam stabilizer is too large, there is a tendency in which a foam stabilizing action becomes intense and a degree of cell openness is decreased.

(Antioxidants)

In the polyurethane resin composition according to the present invention, an antioxidant may be optionally contained in an amount effective to prevent oxidations. In this regard, examples of the antioxidant include hydroquinone compounds and trivalent organic phosphoric acid compounds.

When an antioxidant is used, the amount of the antioxidant used is preferably 0.1 parts by weight or more, and more preferably 0.2 parts by weight or more with respect to 100 parts by weight of the polyurethane resin composition. In addition, it is preferably 5 parts by weight or less, and more preferably 2 parts by weight or less. If storage stability over a long period is not required, it is not necessary to use an antioxidant.

(Other Additives)

Further, additives other than the above-described additives may be optionally used for a composition for polyurethane of the present invention depending on the purpose of their use and within a range in which an intended physical property of the polyurethane is not deteriorated. As such additives, for example, a coloring agent (for example, dye or pigment), a cross-linking agent, an ultraviolet absorber, a hydrolysis inhibitor, a filler (for example, inorganic filler), a reinforcing material (for example, glass fiber reinforcing material), and the like can be blended. The types and amount to be added of these additives are not limited, and an additive generally used can be used in a range of the amount generally used. Specifically, for example, for each of these additives, the amount can be 0.01 parts by weight or more, 0.1 parts by weight or more or 1 part by weight or more with respect to 100 parts by weight of a polyol. Further, the amount can be 20 parts by weight or less, and can be 10 parts by weight or less or 5 parts by weight or less with respect to 100 parts by weight of a polyol.

However, the aforementioned additives, such as coloring agent, cross-linking agent, ultraviolet absorber, hydrolysis inhibitor, filler, reinforcing material, and the like, are not always required for the polyurethane resin composition of the present invention. It is enough as long as these additives are used for a polyurethane resin composition in a minimum required amount based on required performances for an intended polyurethane resin product.

For example, in the field of fiber-reinforced composites and the like, there are some cases where very high strength, very high rigidity, and the like are required. Therefore, a technique of mixing a large amount of a fiber reinforcing material (for example, glass fiber), a large amount of an inorganic filler (for example, glass powder, glass flake), and the like with a resin is known.

In a polyurethane resin composition of the present invention, when it is used to produce a urethane resin product for special use that requires very high strength and very high rigidity, it is also possible to mix a large amount of a fiber reinforcing material (for example, glass fiber) and a large amount of an inorganic filler (for example, glass powder, glass flake) to produce a product having very high strength and very high rigidity. However, in normal use other than special use that requires such very high strength and very high rigidity, it is not necessary to mix a fiber reinforcing material and an inorganic filler.

Conversely, when it is used to produce a urethane resin product for normal use that requires relatively high flexibility, it is not necessary to mix a large amount of a fiber reinforcing material and a large amount of an inorganic filler in a polyurethane resin composition of the present invention. Rather than that, in order to obtain high flexibility, it is generally preferable that the amount of a fiber reinforcing material and an inorganic filler is small or a fiber reinforcing material and an inorganic filler are not present. In addition, even when a fiber reinforcing material and an inorganic filler are not present, it is possible to achieve required performances for a urethane resin product for normal use, such as high flame retardance, high flexibility, and the like.

(Other Flame Retardants)

If necessary, a flame retardant of the present invention can be used, in addition to a compound consisting of the above-described phosphoramidate compound, in a mixture with a flame retardant other than the phosphoramidate compound.

For example, if necessary, an organic-type flame retardant other than the phosphoramidate compounds or an inorganic-type flame retardant can be used. Examples of the organic-type flame retardant other than the phosphoramidate compounds include a melamine-based flame retardant, a halogen-based flame retardant, a phosphate-based flame retardant, and the like. Examples of the inorganic-type flame retardant include antimony compounds, metal hydroxides, and the like. Specific examples of the metal hydroxides include, for example, aluminum hydroxide (alumina hydrate), magnesium hydroxide, and the like.

However, in order to take advantage of the flame retardant of the present invention, it is preferable that an amount of a flame retardant other than the phosphoramidate compounds to be used is small. For example, the amount of a flame retardant other than the phosphoramidate compounds to be used is preferably 20 parts by weight or less, more preferably 10 parts by weight or less, further preferably 5 parts by weight or less, even more preferably 1 part by weight or less with respect to 100 parts by weight of a polyol. Further, for example, the amount of a flame retardant other than the phosphoramidate compounds to be used is preferably 100 parts by weight or less, more preferably 50 parts by weight or less, further preferably 20 parts by weight or less, and even more preferably 10 parts by weight or less with respect to 100 parts by weight of a flame retardant of the present invention.

In addition, in one preferable embodiment, for the amount of a flame retardant other than the phosphoramidate compounds to be used, the amount is preferably 5 parts by weight or less, 1 part by weight or less, 0.5 parts by weight or less, 0.1 parts by weight or less, 0.05 parts by weight or less, 0.01 parts by weight or less, 0.009 parts by weight or less, 0.008 parts by weight or less, 0.005 parts by weight or less, 0.001 parts by weight or less, 0.0005 parts by weight or less, or 0.0001 parts by weight or less with respect to 100 parts by weight of the resin.

In a particularly preferable embodiment, only a flame retardant consisting of the phosphoramidate compound is used without mixing a flame retardant other than the phosphoramidate compounds.

A flame retardant of the present invention can achieve high flame retardance and a variety of performances required for general urethane resin products without mixing with a flame retardant other than the phosphoramidate compounds. Accordingly, if an intended urethane resin product is not a product for special use, it is not necessary to mix a flame retardant other than the phosphoramidate compounds into a flame retardant of the present invention.

(Polyurethane Foam Raw Material Composition)

By mixing a flame retardant of the present invention with each of the aforementioned raw materials for a polyurethane foam, a polyurethane foam raw material composition is obtained. In one embodiment, by mixing a flame retardant of the present invention with a polyol and optionally the aforementioned additives, a polyurethane foam raw material composition is obtained.

In raw materials for polyurethane, once a polyol is mixed with a polyisocyanate, the reaction is initiated at room temperature. Thus, if a polyurethane foam raw material composition is necessary to be stored in a condition prior to initiation of the reaction, it is usually stored in a condition where a polyol is not mixed with a polyisocyanate. For example, storage and reaction may be carried out in the following manner: raw materials other than a polyisocyanate are mixed to make a urethane raw material composition, the raw material composition is stored separately from the polyisocyanate, and the raw material composition is mixed with the polyisocyanate for a reaction immediately before carrying out the reaction.

The raw material composition may comprise all raw materials other than a polyisocyanate. Specifically, one raw material composition may comprise all raw materials other than a polyisocyanate. However, if necessary, raw materials other than a polyisocyanate may further be divided. For example, it is possible that a mixture of a polyol and a flame retardant is prepared as a raw material composition and stored, other additives and the like are separately provided, and all raw materials are mixed prior to a reaction with a polyisocyanate. Further, for example, it is possible that raw materials other than a polyisocyanate are divided and prepared into two or more raw material compositions and they are stored. For example, it is possible that a product obtained by adding a dispersing agent to a small amount of a polyol is prepared as one raw material composition and the remaining polyol and so on are separately prepared as another raw material composition. If a product obtained by adding a dispersing agent to a small amount of a polyol is made as a raw material composition, then, for example, it is possible to carry out the whole process in such a manner that this composition is stored, mixed with the remaining polyol and so on prior to the reaction, and further mixed with a polyisocyanate to react them.

In one embodiment, for example, it is possible that a dispersing agent is added to a polyol and a flame retardant of the present invention is homogeneously dispersed into the polyol to make a raw material composition. A phosphoramidate is not dissolved in a polyol. However, by adding a dispersing agent, a composition that does not separate over time is obtained.

If a polyisocyanate is mixed into a polyurethane foam raw material composition, a curing reaction is initiated in the composition. Therefore, in the present specification, for convenience, among polyurethane foam raw material compositions, a composition containing a polyisocyanate is referred to as a polyurethane foam reactive raw material composition. In one embodiment, by mixing a flame retardant of the present invention with a polyol, a polyisocyanate, and optionally the aforementioned additives, a polyurethane foam reactive raw material composition is obtained.

In a polyurethane foam reactive raw material composition, the reaction is immediately initiated. Therefore, a polyurethane foam reactive raw material composition usually contains all raw materials to form a polyurethane foam. In addition, by a reaction of a reactive raw material composition, an intended polyurethane foam can be obtained.

The polyurethane foam raw material composition preferably comprises substantially only materials necessary for the polyurethane foam raw material composition. Specifically, it is preferable that the polyurethane foam raw material composition does not substantially comprise an unnecessary material. In one embodiment, the amount of materials other than the above-described components (a polyol, a catalyst, a foaming agent, a foam stabilizer, and an antioxidant) contained in the polyurethane foam raw material composition is preferably 10% by weight or less, more preferably 5% by weight or less, further preferably 1% by weight or less, even more preferably 0.5% by weight or less, and particularly preferably 0.1% by weight or less with respect to the whole raw material composition.

As mentioned above, even when a flame retardant of the present invention is not mixed with a flame retardant other than the phosphoramidate compounds, it can attain high flame retardance and a variety of performances required for general urethane resin products. Therefore, a polyurethane foam raw material composition can also be made as a composition that does not substantially comprise a flame retardant other than the phosphoramidate compounds. For example, a polyurethane foam raw material composition can also be made as a composition that does not substantially comprise an organic-type flame retardant other than the phosphoramidate compounds. For example, a polyurethane foam raw material composition can also be made as a composition that does not substantially comprise a melamine compound. In addition, a polyurethane foam raw material composition can also be made as a composition that does not comprise an inorganic-type flame retardant. For example, a polyurethane foam raw material composition can also be made as a composition that does not comprise a hydroxide-type flame retardant. Further, for example, a polyurethane foam raw material composition can also be made as a composition that does not comprise alumina hydrate.

The polyurethane foam reactive raw material composition preferably comprises substantially only materials required for the polyurethane foam reactive raw material composition. Specifically, it is preferable that the polyurethane foam reactive raw material composition does not substantially comprise an unnecessary material. In one embodiment, the amount of materials other than the above-described components (a polyol, a polyisocyanate, a catalyst, a foaming agent, a foam stabilizer, and an antioxidant) contained in the polyurethane foam reactive raw material composition is preferably 10% by weight or less, more preferably 5% by weight or less, further preferably 1% by weight or less, even more preferably 0.5% by weight or less, and particularly preferably 0.1% by weight or less with respect to the whole reactive raw material composition.

Similarly to the polyurethane foam raw material composition, the polyurethane foam reactive raw material composition can also be made as a composition that does not substantially comprise a flame retardant other than the phosphoramidate compounds. For example, the polyurethane foam reactive raw material composition can also be made as a composition that does not substantially comprise an organic-type flame retardant other than the phosphoramidate compounds. For example, the polyurethane foam reactive raw material composition can also be made as a composition that does not substantially comprise a melamine compound. In addition, the polyurethane foam reactive raw material composition can also be made as a composition that does not comprise an inorganic-type flame retardant. For example, the polyurethane foam reactive raw material composition can also be made as a composition that does not comprise a hydroxide-type flame retardant. Further, for example, the polyurethane foam reactive raw material composition can also be made as a composition that does not comprise alumina hydrate.

(Polyurethane Foam)

A polyurethane foam of the present invention (hereinafter also referred to as a polyurethane foamed article) is produced according to a general production method of a polyurethane foam except that a flame retardant of the present invention is contained. Specifically, in a polyurethane foamed article raw material composition containing a polyol, a polyisocyanate, and a flame retardant as well as optionally a foaming agent, a catalyst, and so on, it is obtained through foaming and curing by reacting the polyol and the polyisocyanate.

The polyurethane foam may be a rigid polyurethane foam or may be a flexible polyurethane foam.

The polyurethane foam preferably comprises substantially only materials required for the polyurethane foam. That is, it is preferable that the polyurethane foam does not substantially comprise an unnecessary material. In one embodiment, the amount of materials other than the above-described components (a polyurethane resin, a catalyst, a foaming agent, a foam stabilizer, and an antioxidant) contained in the polyurethane foam is preferably 10% by weight or less, more preferably 5% by weight or less, further preferably 1% by weight or less, even more preferably 0.5% by weight or less, and particularly preferably 0.1% by weight or less with respect to the whole polyurethane foam.

Similarly to the polyurethane foam reactive raw material composition, the polyurethane foam can also be made as a foam that does not substantially comprise a flame retardant other than the phosphoramidate compounds. For example, the polyurethane foam can also be made as a foam that does not substantially comprise an organic-type flame retardant other than the phosphoramidate compounds. For example, the polyurethane foam can also be made as a foam that does not substantially comprise a melamine compound. In addition, the polyurethane foam can also be made as a foam that does not comprise an inorganic-type flame retardant. For example, the polyurethane foam can also be made as a foam that does not comprise a hydroxide-type flame retardant. Further, for example, the polyurethane foam can also be made as a foam that does not comprise alumina hydrate.

(Urethane Curing Reaction)

By a reaction of a polyisocyanate and an active-hydrogen-containing compound such as polyol and the like, a polyurethane reactive raw material composition is cured. In carrying out the curing, the mixing method and the order of each of raw materials are not particularly limited, and any method and any order are possible. All raw materials may be mixed once to form the above-described urethane reactive raw material composition in one step, or each of raw materials may be sequentially mixed to form the above-described urethane reactive raw material composition in a plurality of steps. For example, it is possible that components other than a polyisocyanate are stirred and mixed to form a urethane raw material composition in advance, and a polyisocyanate is added immediately before carrying out curing reaction. However, once a polyisocyanate and an active-hydrogen-containing compound such as polyol, water, or the like are mixed, the reaction is initiated even at room temperature. Accordingly, it is preferable to mix each of the raw materials in such a procedure that all the raw materials are mixed when a polyisocyanate and an active-hydrogen-containing compound such as polyol, water, or the like are mixed.

Curing and foaming of a urethane foam can be carried out with any conventionally known method. By carrying out curing and foaming with a urethane reactive raw material composition containing a flame retardant of the present invention, a polyurethane foam composition is obtained.

(Elastomer)

In one embodiment, a flame retardant of the present invention can be used as a flame retardant for a polyurethane elastomer. A polyurethane elastomer refers to a polyurethane elastic synthetic substance used in the rubber field.

The polyurethane elastomer may be thermoplastic polyurethane elastomer or may be a thermoset polyurethane elastomer.

The polyurethane elastomer may be a polyurethane foam elastomer in which the polyurethane is foamed or may be an elastomer in which the polyurethane is not foamed.

When a flame retardant of the present invention is used in a thermoplastic polyurethane elastomer, a flame retardant polyurethane elastomer composition can be obtained by mixing the flame retardant of the present invention with the thermoplastic polyurethane elastomer. As a thermoplastic polyurethane elastomer, any conventionally known thermoplastic polyurethane elastomer can be used.

When a flame retardant of the present invention is used in a thermosetting polyurethane elastomer, after the flame retardant of the present invention is mixed into reactive raw materials for the thermosetting polyurethane elastomer, a curing reaction is carried out.

In one embodiment, a flame retardant of the present invention, a polyol for an elastomer, and a polyisocyanate as well as optionally various additives are mixed to prepare a urethane reactive raw material composition, and once this reactive raw material composition is reacted, a flame retardant elastomer composition can be obtained.

As a polyol for an elastomer, any polyol that has been conventionally used for a polyurethane elastomer can be used. For example, the aforementioned various polyols can be used. The polyol for an elastomer preferably comprises a glycol called chain extender. Introduction of a chain extender can impart suitable elasticity to an elastomer. Examples of the chain extender include lower alkylene glycol such as ethylene glycol, propylene glycol, and the like. The number of carbon atoms of the lower alkylene glycol may be, for example, 1, 2, 3, 4, 5, or 6.

In this regard, as various additives used for a reactive raw material composition, the additives which are the same as those described in relation to the aforementioned polyurethane foam can be used in the same amount in the same manner. However, in the case of an elastomer in which a polyurethane elastomer is not foamed, a foaming agent and a foam stabilizer are unnecessary to use. Accordingly, among the aforementioned various additives, a foaming agent and a foam stabilizer are not used and additives other than a foaming agent and a foam stabilizer are used to prepare a reactive raw material composition.

With regard to the raw material for a polyurethane elastomer, once a polyol is mixed with a polyisocyanate, the reaction is initiated at room temperature. Therefore, if it is necessary to store a polyurethane elastomer raw material composition in a condition before the reaction is initiated, it is usually stored in a condition where a polyol is not mixed with a polyisocyanate.

For example, storage and reaction may be carried out in such a manner that raw materials other than a polyisocyanate are mixed to make a urethane raw material composition, it is stored separately from a polyisocyanate, and the raw material composition is mixed with a polyisocyanate for a reaction immediately before the reaction is carried out.

The raw material composition may comprise all raw materials other than a polyisocyanate. Specifically, one raw material composition may comprise all raw materials other than a polyisocyanate. However, if necessary, raw materials other than a polyisocyanate may be further divided. For example, it is possible that a mixture of a polyol and a flame retardant is prepared as a raw material composition and stored, other additives and the like are separately provided, and all raw materials are mixed before the reaction with a polyisocyanate. Further, for example, it is possible that the raw materials other than a polyisocyanate are divided and prepared into two or more raw material compositions and they are stored. For example, it is possible that a product obtained by adding a dispersing agent to a small amount of a polyol is prepared as one raw material composition, and the remaining polyol and so on are separately prepared into another raw material composition. If a product obtained by adding a dispersing agent to a small amount of a polyol is made as a raw material composition, for example, the whole processes can be carried out in such a manner that this composition is stored and mixed with the remaining polyol and so on before reacting, and further a polyisocyanate is mixed and reacted.

In one embodiment, for example, a raw material composition can be made by adding a dispersing agent to a polyol and homogeneously dispersing a flame retardant of the present invention in the polyol. Although a phosphoramidate is not dissolved in a polyol, a composition that does not separate over time is obtained by adding a dispersing agent.

Once a polyisocyanate is mixed into a polyurethane elastomer raw material composition, a curing reaction is initiated in the composition. Thus, in the present specification, for convenience, among polyurethane elastomer raw material compositions, a composition containing a polyisocyanate is referred to as a polyurethane elastomer reactive raw material composition. In one embodiment, a polyurethane elastomer reactive raw material composition is obtained by mixing a flame retardant of the present invention with a polyol, a polyisocyanate, and optionally the aforementioned additives. In this regard, preferably, as the polyol, a polyol suitable for an elastomer containing a chain extender is used.

In a polyurethane elastomer reactive raw material composition, the reaction is immediately initiated. Thus, a polyurethane elastomer reactive raw material composition usually contains all raw materials to form a polyurethane elastomer. In addition, by a reaction of a reactive raw material composition, an intended polyurethane elastomer can be obtained.

The polyurethane elastomer raw material composition preferably comprises substantially only materials required for a polyurethane elastomer raw material composition. Specifically, it is preferable that the polyurethane elastomer raw material composition does not substantially comprise an unnecessary material. In one embodiment, the amount of materials other than the above-described components (a polyol, a catalyst, a foaming agent, a foam stabilizer, and an antioxidant) contained in the polyurethane elastomer raw material composition is preferably 10% by weight or less, more preferably 5% by weight or less, further preferably 1% by weight or less, even more preferably 0.5% by weight or less, and particularly preferably to be 0.1% by weight or less with respect to the whole raw material composition.

As mentioned above, even when a flame retardant of the present invention is not mixed with a flame retardant other than the phosphoramidate compounds, it is possible to attain high flame retardance and a variety of performances required for general urethane resin products. Therefore, the polyurethane elastomer raw material composition can also be made as a composition that does not substantially comprise a flame retardant other than the phosphoramidate compounds. For example, the polyurethane elastomer raw material composition can also be made as a composition that does not substantially comprise an organic-type flame retardant other than the phosphoramidate compounds. For example, the polyurethane elastomer raw material composition can also be made as a composition that does not substantially comprise a melamine compound. In addition, the polyurethane elastomer raw material composition can also be made as a composition that does not comprise an inorganic-type flame retardant. For example, the polyurethane elastomer raw material composition can also be made as a composition that does not comprise a hydroxide-type flame retardant. Further, for example, the polyurethane elastomer raw material composition can also be made as a composition that does not comprise alumina hydrate.

The polyurethane elastomer reactive raw material composition preferably comprises only materials required for the polyurethane elastomer reactive raw material composition. That is, it is preferable that the polyurethane elastomer reactive raw material composition does not substantially comprise an unnecessary material. In one embodiment, the amount of materials other than the above-described components (a polyol, a polyisocyanate, a catalyst, a foaming agent, a foam stabilizer, and an antioxidant) contained in the polyurethane elastomer reactive raw material composition is preferable to be 10% by weight or less, more preferable to be 5% by weight or less, further preferable to be 1% by weight or less, even more preferable to be 0.5% by weight or less, and particularly preferable to be 0.1% by weight or less with respect to the whole reactive raw material composition.

Similarly to the polyurethane elastomer raw material composition, the polyurethane elastomer reactive raw material composition can also be made as a composition that does not substantially comprise a flame retardant other than the phosphoramidate compounds. For example, the polyurethane elastomer reactive raw material composition can also be made as a composition that does not substantially comprise an organic-type flame retardant other than the phosphoramidate compounds. For example, the polyurethane elastomer reactive raw material composition can also be made as a composition that does not substantially comprise a melamine compound. In addition, the polyurethane elastomer reactive raw material composition can also be a composition that does not comprise an inorganic-type flame retardant. For example, the polyurethane elastomer reactive raw material composition can also be made as a composition that does not comprise a hydroxide-type flame retardant. Further, for example, the polyurethane elastomer reactive raw material composition can also be made as a composition that does not comprise alumina hydrate.

(Polyurethane Elastomer)

A polyurethane elastomer of the present invention is produced according to a general production method of a polyurethane elastomer except that a flame retardant of the present invention is contained. Specifically, in a polyurethane elastomer reactive raw material composition containing a polyol, a polyisocyanate, and a flame retardant as well as optionally a catalyst, other additives, and the like, the elastomer can be obtained by reacting the polyol and the polyisocyanate.

When a flame retardant of the present invention is used for a thermosetting polyurethane elastomer, it has an advantage of being comprehensively excellent in flame retardance and the performance as a polyurethane elastomer.

The polyurethane elastomer preferably comprises substantially only materials required for a polyurethane elastomer. Specifically, it is preferable that the polyurethane elastomer does not substantially comprise an unnecessary material. In one embodiment, the amount of materials other than the above-described components (a polyurethane resin, a catalyst, a foaming agent, a foam stabilizer, and an antioxidant) contained in the polyurethane elastomer is preferable to be 10% by weight or less, more preferable to be 5% by weight or less, further preferable to be 1% by weight or less, even more preferable to be 0.5% by weight or less, and particularly preferable to be 0.1% by weight or less with respect to the whole polyurethane elastomer.

Similarly to the polyurethane elastomer reactive raw material composition, the polyurethane elastomer can also be made as an elastomer that does not substantially comprise a flame retardant other than the phosphoramidate compounds. For example, the polyurethane elastomer can also be made as an elastomer that does not substantially comprise an organic-type flame retardant other than the phosphoramidate compounds. For example, the polyurethane elastomer can also be made as an elastomer that does not substantially comprise a melamine compound. In addition, the polyurethane elastomer can also be made as an elastomer that does not comprise an inorganic-type flame retardant. For example, the polyurethane elastomer can also be made as an elastomer that does not comprise a hydroxide-type flame retardant. Further, for example, the polyurethane elastomer can also be made as an elastomer that does not comprise alumina hydrate.

(Other Resin Product Uses)

The present specification describes methods of using a flame retardant of the present invention in detail, in particular, with regard to a polyurethane foam and a polyurethane elastomer. It is because the effect of the flame retardant of the present invention is very advantageous in these uses. However, uses of the flame retardant of the present invention are not limited to these uses. It can be used for a polyurethane in a form other than a form of the foam or elastomer. Moreover, it can also be used for resins other than polyurethane, for example, various thermoplastic resins other than thermoplastic polyurethane, and thermosetting resins other than thermosetting polyurethane.

EXAMPLES

Hereinafter, the present invention is described in further detail by showing Synthesis Examples, Reference Examples, Examples, and Comparative Examples.

Synthesis Examples

Synthesis Example 1

Synthesis of a Compound of Formula (1)

[Chemical formula 10A]

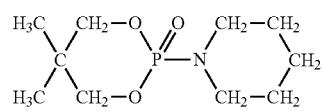

(1)

As the first step reaction, 312.6 g of neopentyl glycol (3.00 mol) and 109.5 g of 1, 4-dioxane were charged in a 1 L four-necked flask equipped with a stirrer, a thermometer, a reflux tube connected to a hydrochloric-acid-recovering device, an aspirator, a dropping funnel, and a heating device. The resulting liquid was heated to 50° C. Subsequently, 460.5 g of phosphorus oxychloride (3.00 mol) was added thereto over 2 hours while the reaction temperature was maintained at 45 to 55° C. After the completion of addition, generated hydrochloric acid was collected while the mixture was further stirred at 80° C. for 1 hour, followed by dehydrochlorination at 80° C. at a reduced pressure of 80 kPa for 3 hours to thereby obtain 662.8 g of a white slurry.

100.6 g of the white slurry obtained above in the first step reaction of Synthesis Example 1 and 214.3 g of 1,4-dioxane were charged in a 1 L four-necked flask equipped with a stirrer, a thermometer, a dropping funnel, and a water bath. While the reaction temperature was maintained at 30 to 40° C., 61.8 g of triethylamine (0.61 mol) was added thereto over 30 minutes. Subsequently, 44.3 g of piperidine (0.52 mol) was gradually added thereto over 1 hour. After the completion of addition, the resulting liquid was stirred at 40° C. for 4 hours. Then, 169.3 g of water was added to this reaction slurry, and the mixture was stirred for 30 minutes, followed by filtration. Thereafter, a step of performing 30-minute repulp washing using water with the same weight as that of the filter cake and filtration was repeated until the filtrate was neutralized. The obtained solid was dried at 80° C. under 2.7 kPa for 8 hours to obtain 100.5 g (83.0% yield) of a flame retardant compound in which compound (1) is the main component. Phosphorus content percentage: 13.3% by weight. Nitrogen content percentage: 6.0% by weight. The obtained flame retardant compound was used in the following Examples.

Synthesis Example 2

Synthesis of a Compound of Formula (4)

[Chemical formula 10B]

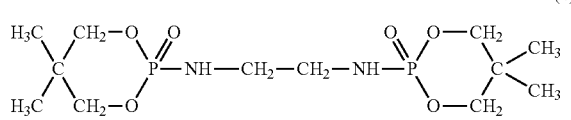

(4)

According to the same method except that 15.6 g of ethylenediamine (0.26 mol) was used in place of the piperidine in Synthesis Example 1, 71.6 g of a solid (77.4% yield) was obtained. Phosphorus content percentage: 17.3% by weight. Nitrogen content percentage: 7.8% by weight. The obtained flame retardant compound was used in the following Reference Examples and Examples.

Synthesis Example 3

Synthesis of a Compound of Formula (10)

[Chemical formula 10C]

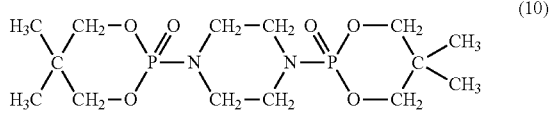

(10)

According to the same method except that 22.4 g of piperazine (0.26 mol) was used in place of the piperidine in Synthesis Example 1, 79.1 g of a solid (79.6% yield) was obtained. Phosphorus content percentage: 16.2% by weight. Nitrogen content percentage: 7.3% by weight. The obtained flame retardant compound was used in the following Reference Examples and Examples.

Synthesis Example 4

A Phosphoramidate Compound Represented by the Following Formula (a Compound of Formula (5))

[Chemical formula 10D]

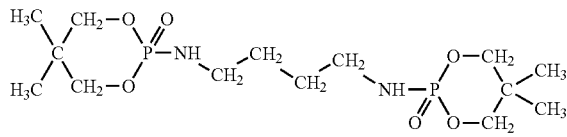

(5)

According to the same method except that 22.9 g of diaminobutane (0.26 mol) was used in place of the piperidine in Synthesis Example 1, 75.9 g of a solid (76.4% yield) was obtained. Phosphorus content percentage: 16.2% by weight. Nitrogen content percentage: 7.3% by weight. The obtained flame retardant compound was used in the following Examples.

Synthesis Example 5

A Phosphoramidate Compound Represented by the Following Formula (a Compound of Formula (6))

[Chemical formula 10E]

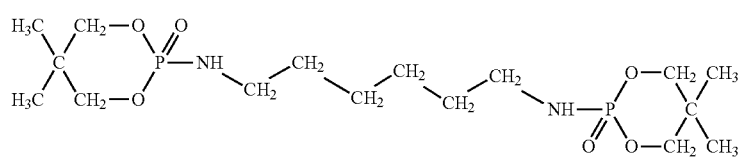

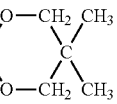

(6)

According to the same method except that 30.2 g of hexamethylene diamine (0.26 mol) was used in place of the piperidine in Synthesis Example 1, 78.5 g of a solid (73.3% yield) was obtained. Phosphorus content percentage: 15.0% by weight. Nitrogen content percentage: 6.7% by weight. The obtained flame retardant compound was used in the following Examples.

Reference Example 1

0.7 parts by weight of SN-thickener A-812 (produced by San Nopco Limited) was added as a thickener to 20 parts by weight of the flame retardant compound obtained in Synthesis Example 2, 20 parts by weight of ion exchanged water, 40 parts by weight of commercially available acrylic resin emulsion (VONCOAT AB-886, produced by DIC Corporation; solid content: 50%), and 0.4 parts by weight of a 28% aqueous ammonia solution. The resulting mixture was homogenized with a homogenizer to obtain a back-coating agent having a viscosity of 15,000 mPa·s (BM-type viscometer, No. 4 rotor, 12 rpm).

The back-coating agent obtained above was uniformly applied to the back surface of a polyester knit of 250 g/m² such that a dry weight was 60 g/m². Thereafter, it was dried at 150° C. for 3 minutes, and thereby a flame retardant fiber fabric was obtained.

Reference Example 2

A flame retardant fiber fabric was obtained according to the same method as Reference Example 1 except that the flame retardant compound obtained in Synthesis Example 3 was used in an amount of 20 parts by weight as the flame retardant compound.

Comparative Example 1

A flame retardant fiber fabric was obtained according to the same method as Reference Example 1 except that a silane-coated product of ammonium polyphosphate (FR CROS 486, produced by Budenheim; hereinafter referred to as "APP"), which is a polyphosphate-based flame retardant, was used in an amount of 20 parts by weight as the flame retardant compound.

Comparative Example 2

A flame retardant fiber fabric was obtained according to the same method as Reference Example 1 except that a compound having the following structure:

(6)

[Chemical formula 11]

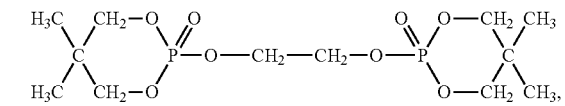

which is a phosphoric acid ester-based flame retardant, was used in an amount of 20 parts by weight as the flame retardant compound.

The flame retardance of the flame retardant fiber fabrics of Reference Examples 1 to 2 and Comparative Examples 1 to 2, and the solubility of the flame retardant compounds in hot water were measured.

[Flame Retardance Test]

The flame retardance test was performed in accordance with the test method of the U.S. Federal Motor Vehicle Safety Standards, FMVSS 302. The test was performed five times in each of horizontal and vertical directions; and when all of the test results satisfied any of the following, the tested fiber fabric was considered to have flame retardance, and given a Pass evaluation: 1) self-extinguished before the marked line A (38 mm); 2) burnt distance after the marked line A was 50 mm or less, and the burning time was 60 seconds or less; and 3) the burning rate after the marked line A was 80 mm/minute or less.

[Solubility Test in Hot Water]

Five parts by weight of each of the flame retardant compounds of Synthesis Examples 2 and 3 and the flame retardant compounds of Comparative Examples 1 and 2 was added to 45 parts by weight of water. The resulting mixture was stirred at 90° C. for 1 hour, and the phosphorus content in the solution obtained by filtration when the mixture was hot was measured to determine the solubility in hot water at 90° C. It should be noted that when the flame retardant compound was fully dissolved, the solubility in hot water was regarded as ">10%".

The following Table 1 shows the results of the flame retardance test and the results of the solubility in hot water test, as well as the phosphorus content percentage and nitrogen content percentage of the flame retardant compounds used.

TABLE 1

|  | Phosphorus content percentage of compound | Nitrogen content percentage of compound | Flame retardance | Solubility of compound in hot water |
|---|---|---|---|---|
| Reference Example 1 | 17.3% | 7.8% | Pass | 0.7% |
| Reference Example 2 | 16.2% | 7.3% | Pass | 0.4% |
| Comparative Example 1 | 31.3% | 14.1% | Pass | 5.9% |
| Comparative Example 2 | 17.3% | — | Failure | >10% |

From Table 1, the fiber fabrics of Reference Examples 1 and 2 exhibit good flame retardance, even though the phosphorus content percentage and nitrogen content percentage of the flame retardant compounds of Reference Examples 1 and 2 which are believed to contribute to flame retardance were less than those of the fiber fabric of Comparative Example 1, which phosphorus content percentage and nitrogen content percentage. Further, it is understood that the solubility in hot water of the flame retardant compounds used in the fiber fabrics of Reference Examples 1 and 2, which causes water spot formation, is low. In contrast, Comparative Example 1, in which APP was used as the flame retardant compound, was given a Pass evaluation in the flame retardance test; however, this fiber fabric has high solubility in hot water, and thus it is likely to cause water spot formation.

The water spot formation as used herein refers to a phenomenon in which adherence of high-temperature vapor used in the production of seats for vehicles as well as moisture, such as rain, sweat, and the like, to the surface of a fiber product causes dissolution of the water-soluble components of the flame retardant, and thereafter the portion which had been wetted turns into a white spot or stain when it is dried.

Further, in Comparative Example 2, a phosphoric acid ester having excellent flame retardance for use in a high-temperature absorption exhaustion treatment for fiber was used as the flame retardant compound. In this regard, the flame retardant compound of Comparative Example 2 is a phosphoric acid ester having a structure similar to that of the flame retardant compound of Reference Example 1, and the phosphorus content of the flame retardant compound of Comparative Example 2 is also equal to that of the flame retardant compound of Reference Example 1. However, as shown in Table 1, the flame retardant compound of Comparative Example 2 has low flame retardance and a high solubility in hot water, and is thus not suitable as a flame retardant for back-coating. From these, it is understood that a back-coating agent containing a phosphoramidate represented by the general formula (I) is very effective as a flame retardant back-coating agent.

Reference Example 3

[Production of Surface Skin Layer]

One hundred parts by weight of a polyurethane material (produced by DIC Corporation, CRISVON MP120; nonvolatile component: 30% by weight) was mixed with 30 parts by weight of toluene in the ratio to prepare a solution, and thereby a resin composition for forming a surface skin layer was prepared.

Further, the resin composition solution for forming the surface skin layer prepared above was applied to a release paper (produced by Dai Nippon Printing Co., Ltd., DE73) using an applicator which was set to 320 μm. The resulting applied film was dried at 110° C. for 4 minutes to prepare a coating film for a surface skin layer, which coating film has a post-drying average film thickness of 40 μm.

[Preparation of Resin Composition for Forming Adhesive Layer]

A resin composition for forming an adhesive layer was prepared by using 100 parts by weight of a polyurethane material for adhesion (produced by DIC Corporation, CRISVON 4010; nonvolatile component: 50% by weight), 10 parts by weight of an isocyanate-based crosslinking agent (produced by DIC Corporation, BURNOCK D-750; nonvolatile component: 75% by weight), 3 parts by weight of a crosslinking accelerator (produced by DIC Corporation, CRISVON Accel HM, nonvolatile component: 15% by weight), 6.45 parts by weight of the flame retardant compound of Synthesis Example 2 (nonvolatile component: 100% by weight) as a flame retardant, and 22.8 parts by weight of toluene.

[Preparation of Synthetic Leather]

The above-described resin composition for forming an adhesive layer was further applied to the upper surface of the above-described coating film for a surface skin layer by using an applicator which was set to 320 μm, and a base fabric (a polyester knit; weight per area: 250 g/m$^2$) was laminated thereon, and pressure-bonded. The resulting product was heated at 110° C. for 4 minutes to accelerate curing while the solvent was removed. Then, aging was performed at 25° C. for three days to complete the curing of the adhesive layer, and the release paper was peeled off to complete a flame retardant synthetic leather. The adhesive layer had a thickness of 150 μm.

[Flame Retardance Test]

The flame retardance test was performed on the above-described flame retardant synthetic leather in accordance with the test method of the U.S. Federal Motor Vehicle Safety Standards, FMVSS 302. The test was performed a total of 5 times, and when self-extinguishment was observed before the marked line A (38 mm) in all of the test results, the leather was judged as having flame retardance and given a Pass evaluation. The results are shown in Table 2.

Reference Example 4

A synthetic leather was obtained in the same manner as that in Reference Example 3, except that the flame retardant compound of Synthesis Example 3 was used as the flame retardant. The flame retardance was then measured. The results are shown in Table 2.

Comparative Example 3

A synthetic leather was obtained in the same manner as that in Reference Example 3, except that the phosphoric acid ester flame retardant compound which was used in Comparative Example 2 was used as the flame retardant. The flame retardance was then measured. The results are shown in Table 2.

Comparative Example 4

A synthetic leather was obtained in the same manner as that in Reference Example 3 except that 20 parts by weight of tetrakis(2,6-dimethylphenyl)-m-phenylene bisphosphate, which is a phosphoric acid ester widely used as a flame retardant for resins, and 39.2 parts by weight of toluene were used. The flame retardance was then measured. The results are shown in Table 2.

TABLE 2

| | Phosphorus content percentage of compound (% by weight) | Content percentage of compound in adhesive layer (% by weight) | Maximum burnt distance in flame retardance test (mm) | Flame retardance |
|---|---|---|---|---|
| Reference Example 3 | 17.3% | 10% | 13 mm | Pass |
| Reference Example 4 | 16.2% | 10% | 27 mm | Pass |
| Comparative Example 3 | 17.3% | 10% | 44 mm | Failure |
| Comparative Example 4 | 9.0% | 25.7% | 48 mm | Failure |

From Table 2, it is understood that the synthetic leathers of Reference Examples 3 and 4 have higher flame retardance than the synthetic leathers of Comparative Examples 3 and 4 in which a phosphoric acid ester having excellent flame retardance for use in a high-temperature absorption exhaustion treatment for fiber was used.

EXAMPLES

In the below-described examples, the following was used as the raw material.
(1) Polyol: A polyether-type triol based on glycerin and propylene oxide, molecular weight: about 3000, hydroxyl value: 56.0, produced by Mitsui Chemicals, Inc., trade name: Actcol T-3000
(2) Silicone foam stabilizer: Produced by Momentive Performance Materials Japan LLC., trade name: Niax Silicone L-638J
(3) Amine-based catalyst:
  Produced by Air Products and Chemicals, Inc., trade name: DABCO 33LV
  Produced by Air Products and Chemicals, Inc., trade name: DABCO BL-11
(4) Tin-based catalyst:
  Produced by Air Products and Chemicals, Inc., trade name: DABCO T-9)
(5) Foaming agent:
  Water
  dichloromethane
(6) Polyisocyanate: Tolylene diisocyanate (TDI)
  (produced by Mitsui Chemicals, Inc., trade name: Cosmonate T-80)
  (2,4-isomer/2,6-isomer=80/20 (% by weight))
(7) Flame retardant: The following flame retardants A to G were used.

(Flame Retardant A)

A Phosphoramidate Compound Represented by the Following Formula (a Compound of Formula (1))

[Chemical formula 12A]

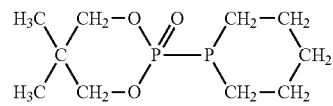

(Flame Retardant B)

A Phosphoramidate Compound Represented by the Following Formula (a Compound of Formula (4))

[Chemical formula 12B]

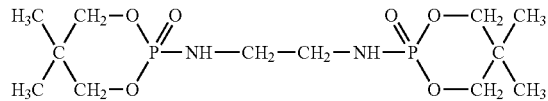

(Flame Retardant C)

A Phosphoramidate Compound Represented by the Following Formula (a Compound of Formula (10))

[Chemical formula 12C]

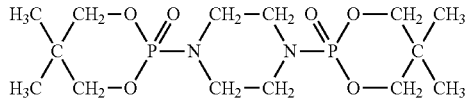

(Flame Retardant D)

A Phosphoramidate Compound Represented by the Following Formula (a Compound of Formula (5))

[Chemical formula 12D]

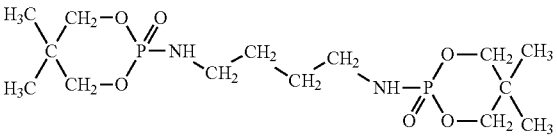

(Flame Retardant E)

A Phosphoramidate Compound Represented by the Following Formula (a Compound of Formula (6))

[Chemical formula 12E]

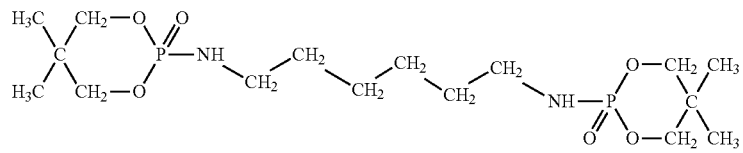

(Flame Retardant F)

Phosphoric acid, oxydi-2,1-ethanediyl tetrakis(2-chloro-1-methylethyl) ester (Flame Retardant G) Antiblaze V-66 (Produced by Albemarle Corporation)

Main component: 2,2-bis(chloromethyl)-1,3,-propanediol bis[bis(2-chloroethyl)phosphate]

Example 1

(Production Method)

According to the formulation shown in Table 3, a polyol, a silicone foam stabilizer, an amine-based catalyst, a tin-based catalyst, a foaming agent, and flame retardant A were mixed, and stirred using a stirrer at a rotation rate of 3000 rpm for 1 minute to homogeneously admix the blended formulation. Thereafter, a polyisocyanate was further added thereto, and the liquid was stirred at a rotation rate of 3000 rpm for 5 to 7 seconds, and immediately the contents were poured into a cubic cardboard box (height: about 200 mm) of which the bottom is square (one side: about 200 mm).

Foaming occurred immediately and the volume reached the maximum after several minutes. Thereafter, the maximum volume was approximately maintained. The obtained foamed article was stood and cured in a furnace at temperature of 80° C. for 30 minutes to obtain a polyurethane foam (foamed article). The obtained foamed article had white flexible open cell-type cell structure. The flame retardance, anti-fogging characteristics, residual distortion by compression, and scorch characteristic thereof were evaluated by the following methods.

(Flame Retardance Evaluation)

A sample was cut from the obtained foamed article and a combustion test was carried out under the following condition.

Test method: FMVSS-302 method (test method of safety standards for automobile upholstery)

Horizontal burning test of a polyurethane foam

Test condition: adjusted such that the air-permeability was 200 ml/cm$^2$/sec.

(The air-permeability was measured according to the JIS K6400-7B method.)

Sample: 160 mm length, 70 mm width, 13 mm thickness

Valuation criteria:

NB: a burnt distance is 38 mm or less

SE: a burnt distance is 39 mm or more and 88 mm or less

BN: a burnt distance is 89 mm or more.

(Anti-Fogging Characteristics Evaluation)

A sample was cut from the obtained foamed article and anti-fogging characteristics test was carried out under the following condition.

Test condition: A windscreen fogging tester (produced by Suga Test Instruments Co., Ltd.) was used, and a sample of a polyurethane foam (diameter: 80 mm, thickness: 10 mm) was placed in the lower portion of a container thereof. The sample was heated at 100° C. for 16 hours. The amount of substances which were scattered from the sample and attached to aluminum foil at the upper portion of the container was measured as an aluminum-attaching amount (mg).

(Residual Distortion by Compression (%))

Residual distortion by compression (%) was measured in accordance with JIS K6400-4:2004.

(Scorch (YI))

The obtained foamed article was maintained in a microwave for 3 minutes and then at 70° C. for 4.5 minutes. Thereafter, a color-difference meter (Nippon Denshoku Industries Co., Ltd., Color Meter ZE2000) was used to measure a yellowing degree (whiteness degree) for the center portion of the foamed article, which was at a high temperature, and the side portion, which was at a low temperature. The color difference between them was expressed in ΔYI.

The results are shown in Table 3.

Examples 2 to 5 and Comparative Examples 5 and 6

Foamed articles were produced in the same manner as that in Example 1 except that flame retardant B, C, D, E, F, or G was used in place of flame retardant A as shown in Table 3. The flame retardance, anti-fogging characteristics, residual distortion by compression, and scorch characteristic thereof were evaluated. The results are shown in Table 3.

Examples 2A to 5A and 2B to 5B and Comparative Examples 5B and 6B

Foam articles were produced in the same manner as that in Example 1 except that the type and amount of a flame retardant were changed as shown in Tables 4 and 5. The flame retardance, anti-fogging characteristics, residual distortion by compression, and scorch characteristic thereof were evaluated. The results are shown in Tables 4 and 5.

TABLE 3

| | | Example | | | | | Comparative Example | |
|---|---|---|---|---|---|---|---|---|
| | | 1 | 2 | 3 | 4 | 5 | 5 | 6 |
| Polyol | T-3000 | 100 | 100 | 100 | 100 | 100 | 100 | 100 |
| Silicone foam stabilizer | L-638J | 1 | 1 | 1 | 1 | 1 | 1 | 1 |
| Amine-based catalyst | DABCO 33LV | 0.2 | 0.2 | 0.2 | 0.2 | 0.2 | 0.2 | 0.2 |
| | DABCO BL11 | 0.05 | 0.05 | 0.05 | 0.05 | 0.05 | 0.05 | 0.05 |
| Tin-based catalyst | DABCO T9 | 0.3 | 0.3 | 0.3 | 0.3 | 0.3 | 0.3 | 0.3 |
| Foaming agent | Water | 4.3 | 4.3 | 4.3 | 4.3 | 4.3 | 4.3 | 4.3 |
| | Dichloromethane | 8 | 8 | 8 | 8 | 8 | 8 | 8 |
| Polyisocyanate | T-80 | 58.1 | 58.1 | 58.1 | 58.1 | 58.1 | 58.1 | 58.1 |
| Flame retardant | Flame retardant A | 16 | | | | | | |
| | Flame retardant B | | 16 | | | | | |
| | Flame retardant C | | | 16 | | | | |
| | Flame retardant D | | | | 16 | | | |
| | Flame retardant E | | | | | 16 | | |
| | Flame retardant F | | | | | | 16 | |
| | Flame retardant G | | | | | | | 16 |
| Flame retardance | Burnt distance (mm) | 37 | 23 | 35 | 25 | 23 | 93 | 96 |
| | Evaluation | NB | NB | NB | NB | NB | BN | BN |
| Anti-fogging characteristics | Amount attached to aluminum (mg) | 5.1 | <0.1 | <0.1 | <0.1 | <0.1 | 2.6 | 0.6 |
| Residual distortion by compression | % | 6 | 4 | 2 | 8 | 4 | 4 | 4 |
| Scorch | ΔYI | 30 | 3 | 1 | 69 | 63 | 3 | 87 |

TABLE 4

| | | Example | | | |
|---|---|---|---|---|---|
| | | 2A | 3A | 4A | 5A |
| Polyol | T-3000 | 100 | 100 | 100 | 100 |
| Silicone foam stabilizer | L-638J | 1 | 1 | 1 | 1 |
| Amine-based catalyst | DABCO 33LV | 0.2 | 0.2 | 0.2 | 0.2 |
| | DABCO BL11 | 0.05 | 0.05 | 0.05 | 0.05 |
| Tin-based catalyst | DABCO T9 | 0.3 | 0.3 | 0.3 | 0.3 |
| Foaming agent | Water | 4.3 | 4.3 | 4.3 | 4.3 |
| | Dichloromethane | 8 | 8 | 8 | 8 |
| Polyisocyanate | T-80 | 58.1 | 58.1 | 58.1 | 58.1 |
| Flame retardant | Flame retardant B | 14 | | | |
| | Flame retardant C | | 14 | | |
| | Flame retardant D | | | 14 | |
| | Flame retardant E | | | | 14 |
| Flame retardance | Burnt distance (mm) | 37 | 43 | 37 | 36 |
| | Evaluation | NB | SE | NB | NB |
| Anti-fogging characteristics | Amount attached to aluminum (mg) | <0.1 | <0.1 | <0.1 | <0.1 |
| Residual distortion by compression | % | 3 | 2 | 4 | 4 |
| Scorch | ΔYI | 3 | 1 | 65 | 60 |

TABLE 5

|  |  | Example | | | | Comparative Example | |
| --- | --- | --- | --- | --- | --- | --- | --- |
|  |  | 2B | 3B | 4B | 5B | 5B | 6B |
| Polyol | T-3000 | 100 | 100 | 100 | 100 | 100 | 100 |
| Silicone foam stabilizer | L-6383 | 1 | 1 | 1 | 1 | 1 | 1 |
| Amine-based catalyst | DABCO 33LV | 0.2 | 0.2 | 0.2 | 0.2 | 0.2 | 0.2 |
|  | DABCO BL11 | 0.05 | 0.05 | 0.05 | 0.05 | 0.05 | 0.05 |
| Tin-based catalyst | DABCO T9 | 0.3 | 0.3 | 0.3 | 0.3 | 0.3 | 0.3 |
| Foaming agent | Water | 4.3 | 4.3 | 4.3 | 4.3 | 4.3 | 4.3 |
|  | Dichloromethane | 8 | 8 | 8 | 8 | 8 | 8 |
| Polyisocyanate | T-80 | 58.1 | 58.1 | 58.1 | 58.1 | 58.1 | 58.1 |
| Flame retardant | Flame retardant B | 18 |  |  |  |  |  |
|  | Flame retardant C |  | 18 |  |  |  |  |
|  | Flame retardant D |  |  | 18 |  |  |  |
|  | Flame retardant E |  |  |  | 18 |  |  |
|  | Flame retardant F |  |  |  |  | 18 |  |
|  | Flame retardant G |  |  |  |  |  | 18 |
| Flame retardance | Burnt distance (mm) | 18 | 29 | 20 | 19 | 87 | 88 |
|  | Evaluation | NB | NB | NB | NB | SE | SE |
| Anti-fogging characteristics | Amount attached to aluminum (mg) | <0.1 | <0.1 | <0.1 | <0.1 | 2.7 | 0.7 |
| Residual distortion by compression | % | 4 | 2 | 4 | 4 | 4 | 5 |
| Scorch | ΔYI | 3 | 1 | 69 | 66 | 4 | 90 |

From the above results, the evaluations on flame retardance in Examples 1 to 5, 2A to 5A, and 2B to 5B were each NB or SE, and the results for residual distortion by compression and scorch characteristic were both good. Only in Example 3A, the evaluation on flame retardance was SE, not NB. However, since the burnt distance was 43 mm, it is a level that will not be a problem if it is not for special use requiring very high flame retardance. It should be noted that while the evaluations on flame retardance in Comparative Examples 5B and 6B were also SE, the burnt distance in Comparative Examples 5B and 6B was 87 to 88 mm and the flame retardance in Example 3A was significantly excellent in comparison with that in Comparative Examples 5B and 6B. In addition, regarding Examples 2 to 5, 2A to 5A, and 2B to 5B, anti-fogging characteristics were very good and almost no scattered components were observed. In particular, Examples 2 to 3, 2A to 3A, and 2B to 3B (flame retardants B and C) attained "<0.1" of the value of anti-fogging characteristics, 5 or less of the value of residual distortion by compression, and 5 or less of scorch characteristic, and were confirmed as having comprehensively very high performances. With regard to Example 1, the anti-fogging characteristics thereof is slightly lower than those of Comparative Examples 5 to 6, and the scorch thereof is also slightly lower than that of Comparative Example 5. However, it is not a level that will be a problem if it is for general use other than special use requiring very high performances for anti-fogging characteristics and scorch. For example, in conventionally known flame retardants, there are those giving a worse result in performance of anti-fogging characteristics than Example 1. In addition, for scorch, the result of Example 1 is better than that of Comparative Example 6. Thus, as comprehensive evaluation including flame retardance and residual distortion by compression, Example 1 is better than Comparative Examples 5 to 6, and it can be evaluated that the flame retardant of Example 1 is comprehensively more excellent than conventional flame retardants. In Examples 4, 5, 4A, 5A, 4B, and 5B, the values of scorch characteristic thereof are slightly high. However, they can be sufficiently used if they are for general use other than special use requiring very high performance for scorch characteristic.

In contrast to this, the evaluations on flame retardance in Comparative Examples 5 to 6 were BN. That is, they were given a Failure evaluation in the flame retardance test and were deficient in flame retardance. In Comparative Examples 5B and 6B where the additive amount was increased, the evaluation on flame retardance were SE, however, the burnt distance values were near 89 mm, that is, there is almost no difference from the range to be evaluated as BN. Specifically, in Comparative Examples 5B and 6B, the difference in flame retardance from the Examples was remarkable. As described above, comprehensively very excellent results were confirmed in the Examples for performances as a flame retardant in comparison with the Comparative Examples. The compounds used as a flame retardant in Comparative Examples 5, 6, 5B, and 6B are such a type of compounds that are conventionally known to have high flame retardance. Compared to conventional flame retardants known as such high performance flame retardants, the flame retardant of the present invention was confirmed as having very high performances.

INDUSTRIAL APPLICABILITY

According to the present invention, provided are flame retardant polyurethane foam compositions and elastomer compositions being excellent in flame retardance, anti-fogging characteristics, distortion characteristic, and scorch characteristic by using a phosphoramidate compound having a non-halogen-containing specific structure as a flame retardant.

A urethane foam for which a flame retardant of the present invention has been used is excellent in flame retardance and are excellent in a variety of performances required for urethane foams, and can be used for various applications for which urethane foams have been conventionally used.

A urethane elastomer in which a flame retardant of the present invention has been used is excellent in flame retardance and is excellent in a variety of performances required for the urethane elastomers, and can be used for various applications where urethane elastomers have been conventionally used.

The present invention has been exemplified so far with reference to the favorable embodiments of the present invention, but it should not be construed that the present invention is restricted by the embodiments. It is understood that the scope of the present invention should be construed only by the claims. It is understood that those who are skilled in the art can carry out an equivalent range based on the description of the present specification and technical common sense from the description of the specific favorable embodiments of the present invention. It is understood that the contents of the patents, patent applications and literatures cited in the present specification should be herein incorporated by reference, similarly to the case where the contents themselves are described specifically in the present specification.

The invention claimed is:

1. A flame retardant polyurethane foam reactive raw material composition comprising a flame retardant, a polyol, a polyisocyanate, and a foaming agent, wherein the flame retardant comprises a non-halogen-containing phosphoramidate compound represented by general formula (I):

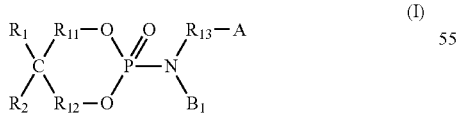

wherein $R_1$ and $R_2$ are each independently an alkyl group in which the number of carbon atoms is 1 to 3,
$R_{11}$ and $R_{12}$ are each independently an alkylene group in which the number of carbon atoms is 1 to 3,
$R_{13}$ is an alkylene group in which the number of carbon atoms is 1 to 6,
$B_1$ is a hydrogen atom or an alkyl group in which the number of carbon atoms is 1 to 6, and
A is a hydrogen atom or an organic group represented by general formula (II):

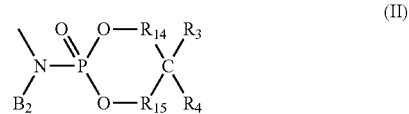

wherein $R_3$ and $R_4$ are each independently an alkyl group in which the number of carbon atoms is 1 to 3, $R_{14}$ and $R_{15}$ are each independently an alkylene group in which the number of carbon atoms is 1 to 3, and $B_2$ is a hydrogen atom or an alkyl group in which the number of carbon atoms is 1 to 6; and
wherein when A is a hydrogen atom, then $B_1$ is an alkyl group in which the number of carbon atoms is 1 to 6, and $B_1$ and $R_{13}$-A are bound to form a nitrogen-containing heterocycle with the nitrogen atom in formula (I), and
when A is an organic group represented by the general formula (II), $B_2$ is an alkyl group in which the number of carbon atoms is 1 to 6, and $B_1$ is an alkyl group in which the number of carbon atoms is 1 to 6, then $B_1$ and $B_2$ may be bound to form a nitrogen-containing heterocycle with the nitrogen atom in formula (I), the nitrogen atom in formula (II) and $R_{13}$.

2. A polyurethane foam comprising a flame retardant, wherein the flame retardant comprises a non-halogen-containing phosphoramidate compound represented by general formula (I):

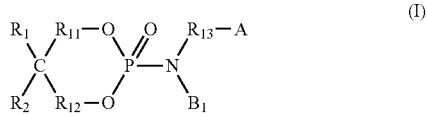

wherein $R_1$ and $R_2$ are each independently an alkyl group in which the number of carbon atoms is 1to 3,
$R_{11}$ and $R_{12}$ are each independently an alkylene group in which the number of carbon atoms is 1 to 3,
$R_{13}$ is an alkylene group in which the number of carbon atoms is 1 to 6,
$B_1$ is a hydrogen atom or an alkyl group in which the number of carbon atoms is 1 to 6, and
A is a hydrogen atom or an organic group represented by general formula (II):

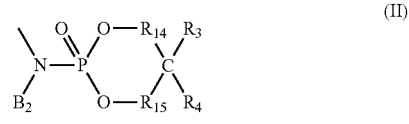

wherein $R_3$ and $R_4$ are each independently an alkyl group in which the number of carbon atoms is 1 to 3, $R_{14}$ and $R_{15}$ are each independently ar alkylene group in which the number of carbon atoms is 1 to 3, and $B_2$ is a hydrogen atom or an alkyl group in which the number of carbon atoms is 1 to 6; and
wherein when A is a hydrogen atom, then $B_1$ is an alkyl group in which the number of carbon atoms is 1 to 6, and $B_1$ and $R_{13}$-A are bound to form a nitrogen-containing heterocycle with the nitrogen atom in formula (I), and when A is an organic group represented by the general formula (II), $B_2$ is an alkyl group in which the number of carbon atoms is 1 to 6, and $B_1$ is an alkyl group in which the number of carbon atoms is 1 to 6, then $B_1$ and $B_2$ may be bound to form a nitrogen-containing heterocycle with the nitrogen atom in formula (I), the nitrogen atom in formula (II) and $R_{13}$.

3. A flame retardant polyurethane elastomer reactive raw material composition comprising a flame retardant, a polyol for an elastomer, a polyisocyanate, and a foaming agent, wherein the flame retardant comprises a non-halogen-containing phosphoramidate compound represented by general formula (I):

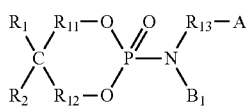

(I)

wherein $R_1$ and $R_2$ are each independently an alkyl group in which the number of carbon atoms is 1 to 3, $R_{11}$ and $R_{12}$ are each independently an alkylene group in which the number of carbon atoms is 1 to 3, $R_{13}$ is an alkylene group in which the number of carbon atoms is 1 to 6, $B_1$ is a hydrogen atom or an alkyl group in which the number of carbon atoms is 1 to 6, and A is a hydrogen atom or an organic group represented by general formula (II):

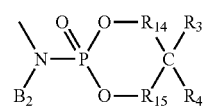

(II)

wherein $R_3$ and $R_4$ are each independently an alkyl group in which the number of carbon atoms is 1 to 3, $R_{14}$ and $R_{15}$ are each independently an alkylene group in which the number of carbon atoms is 1 to 3 , and $B_2$ is a hydrogen atom or an alkyl group in which the number of carbon atoms is 1 to 6 ; and wherein when A is a hydrogen atom, then $B_1$ is an alkyl group in which the number of carbon atoms is 1 to 6 , and $B_1$ and $R_{13}$-A are bound to form a nitrogen-containing heterocycle with the nitrogen atom in formula (I), and wherein A is an organic group represented by the general formula (II), $B_2$ is an alkyl group in which the number of carbon atoms is 1 to 6, and $B_1$ is an alkyl group in which the number of carbon atoms is 1 to 6, then $B_1$ and $B_2$ may be bound to form a nitrogen-containing heterocycle with the nitrogen atom in formula (I), the nitrogen atom in formula (II) and $R_{13}$.

4. A polyurethane elastomer comprising a flame retardant, wherein the flame retardant comprises a non-halogen-containing phosphoramidate compound represented by general formula (I):

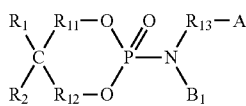

(I)

wherein $R_1$ and $R_2$ are each independently an alkyl group in which the number of carbon atoms is 1 to 3, $R_{11}$ and $R_{12}$ are each independently an alkylene group in which the number of carbon atoms is 1 to 3, $R_{13}$ is an alkylene group in which the number of carbon atoms is 1 to 6, $B_1$ is a hydrogen atom or an alkyl group in which the number of carbon atoms is 1 to 6 , and A is a hydrogen atom or an organic group represented by general formula (II):

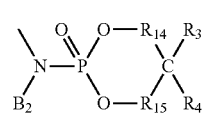

(II)

wherein $R_3$ and $R_4$ are each independently an alkyl group in which the number of carbon atoms is 1 to 3, $R_{14}$ and $R_{15}$ are each independently an alkylene group in which the number of carbon atoms is 1 to 3, and $B_2$ is a hydrogen atom or an alkyl group in which the number of carbon atoms is 1 to 6; and wherein when A is a hydrogen atom, then $B_1$ is an alkyl group in which the number of carbon atoms is 1 to 6, and $B_1$ and $R_{13}$-A are bound to form a nitrogen-containing heterocycle with the nitrogen atom in formula (I), and when A is an organic group represented by the general formula (II), $B_2$ is an alkyl group in which the number of carbon atoms is 1 to 6, and $B_1$ is an alkyl group in which the number of carbon atoms is 1 to 6, then $B_1$ and $B_2$ may he bound to form a nitrogen-containing heterocycle with the nitrogen atom in formula (I), the nitrogen atom in formula (II) and $R_{13}$.

5. The flame retardant polyurethane foam reactive raw material composition according to claim 1, wherein the flame retardant comprises a non-halogen-containing phosphoramidate compound represented by general formula (III):

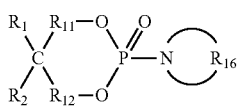

(III)

wherein $R_1$, $R_2$, $R_{11}$ and $R_{12}$ are the same as the definitions in the general formula (I), and $R_{16}$ is an alkylene group in which the number of carbon atoms is 2 to 12.

6. The flame retardant polyurethane foam reactive raw material composition according to claim 1, wherein the flame retardant comprises a non-halogen-containing phosphoramidate compound represented by general formula (IV):

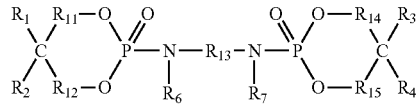

(IV)

wherein $R_1$, $R_2$, $R_{11}$, $R_{12}$ and $R_{13}$ are the same as the definitions in the general formula (I), $R_3$, $R_4$, $R_{14}$ and $R_{15}$ are the same as the definitions in the general formula (II), and $R_6$ and $R_7$ are each independently a hydrogen atom or an alkyl group in which the number of carbon atoms is 1 to 6.

7. The flame retardant polyurethane foam reactive raw material composition according to claim 1, wherein the flame retardant comprises a non-halogen-containing phosphoramidate compound represented by general formula (V):

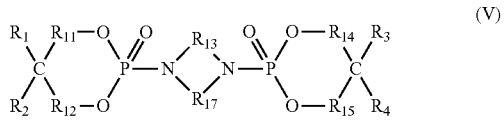

wherein $R_1$, $R_2$, $R_{11}$, $R_{12}$ and $R_{13}$ are the same as the definitions in the general formula (I), $R_3$, $R_4$, $R_{14}$, and $R_{15}$ are the same as the definitions in the general formula (II), and $R_{17}$ is an alkylene group in which the number of carbon atoms is 2 to 12.

8. The polyurethane foam according to claim 2, wherein the flame retardant comprises a non-halogen-containing phosphoramidate compound represented by general formula (III):

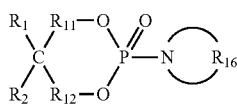

wherein $R_1$, $R_2$, $R_{11}$ and $R_{12}$ are the same as the definitions in the general formula (I), and $R_{16}$ is an alkylene group in which the number of carbon atoms is 2 to 12.

9. The polyurethane foam according to claim 2, wherein the flame retardant comprises a non-halogen-containing phosphoramidate compound represented by general formula (IV):

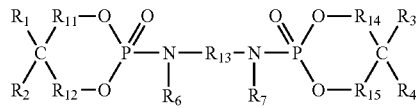

wherein $R_1$, $R_2$, $R_{11}$, $R_{12}$ and $R_{13}$ are the same as the definitions in the general formula (I), $R_3$, $R_4$, $R_{14}$ and $R_{15}$ are the same as the definitions in the general formula (II), and $R_6$ and $R_7$ are each independently a hydrogen atom or an alkyl group in which the number of carbon atoms is 1 to 6.

10. The polyurethane foam according to claim 2, wherein the flame retardant comprises a non-halogen-containing phosphoramidate compound represented by general formula (V):

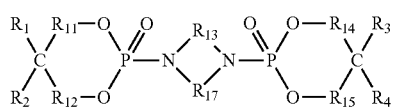

wherein $R_1$, $R_2$, $R_{11}$, $R_{12}$ and $R_{13}$ are the same as the definitions in the general formula (I), $R_3$, $R_4$, $R_{14}$ and $R_{15}$ are the same as the definitions in the general formula (II), and $R_{17}$ is an alkylene group in which the number of carbon atoms is 2 to 12.

11. The flame retardant polyurethane elastomer reactive raw material composition according to claim 3, wherein the flame retardant comprises a non-halogen-containing phosphoramidate compound represented by general formula (III):

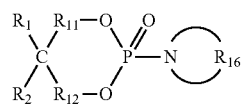

wherein $R_1$, $R_2$, $R_{11}$ and $R_{12}$ are the same as the definitions in the general formula (I), and $R_{16}$ is an alkylene group in which the number of carbon atoms is 2 to 12.

12. The flame retardant polyurethane elastomer reactive raw material composition according to claim 3, wherein the flame retardant comprises a non-halogen-containing phosphoramidate compound represented by general formula (IV):

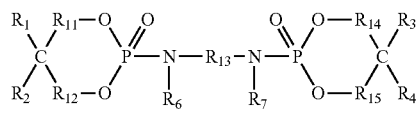

wherein $R_1$, $R_2$, $R_{11}$, $R_{12}$ and $R_{13}$ are the same as the definitions in the general formula (I), $R_3$, $R_4$, $R_{14}$ and $R_{15}$ are the same as the definitions in the general formula (II), and $R_6$ and $R_7$ are each independently a hydrogen atom or an alkyl group in which the number of carbon atoms is 1 to 6.

13. The flame retardant polyurethane elastomer reactive raw material composition according to claim 3, wherein the flame retardant comprises a non-halogen-containing phosphoramidate compound represented by general formula (V):

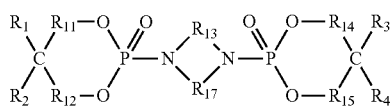

wherein $R_1$, $R_2$, $R_{11}$, $R_{12}$ and $R_{13}$ are the same as the definitions in the general formula (I), $R_3$, $R_4$, $R_{14}$ and $R_{15}$ are the same as the definitions in the general formula (II), and $R_{17}$ is an alkylene group in which the number of carbon atoms is 2 to 12.

14. The polyurethane elastomer according to claim 4, wherein the flame retardant comprises a non-halogen-containing phosphoramidate compound represented by general formula (III):

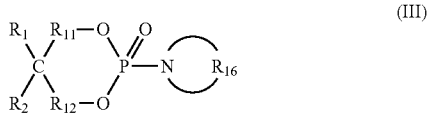

wherein $R_1$, $R_2$, $R_{11}$ and $R_{12}$ are the same as the definitions in the general formula (I), and $R_{16}$ is an alkylene group in which the number of carbon atoms is 2 to 12.

15. The polyurethane elastomer according to claim 4, wherein the flame retardant comprises a non-halogen-containing phosphoramidate compound represented by general formula (IV):

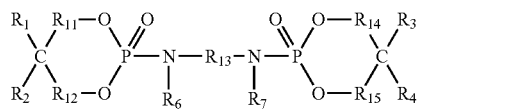

wherein $R_1$, $R_2$, $R_{11}$, $R_{12}$ and $R_{13}$ are the same as the definitions in the general formula (I), $R_3$, $R_4$, $R_{14}$ and $R_{15}$ are the same as the definitions in the general formula (II), and $R_6$ and $R_7$ are each independently a hydrogen atom or an alkyl group in which the number of carbon atoms is 1 to 6.

16. The polyurethane elastomer according to claim 4, wherein the flame retardant comprises a non-halogen-containing phosphoramidate compound represented by general formula (V):

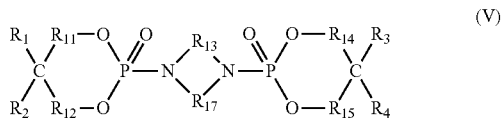

wherein $R_1$, $R_2$, $R_{11}$, $R_{12}$ and $R_{13}$ are the same as the definitions in the general formula (I), $R_3$, $R_4$, $R_{14}$ and $R_{15}$ are the same as the definitions in the general formula (II), and $R_{17}$ is an alkylene group in which the number of carbon atoms is 2 to 12.

\* \* \* \* \*